(12) United States Patent
Samoylenko

(10) Patent No.: US 6,252,881 B1
(45) Date of Patent: Jun. 26, 2001

(54) ADAPTIVE UNIVERSAL MULTIPLE ACCESS

(75) Inventor: Stanislav Ivanovich Samoylenko, deceased, late of Moscow (RU), by Iraida Ivanonvna Samoylenko, Elena Stanislavovna Samoylenko, legal representatives

(73) Assignees: Norwood Living Trust; Iraida Ivanonvna Samoylenko; Elena Stanislavovna Samoylenko

( * ) Notice: Subject to any disclaimer, the term of this patent is extended or adjusted under 35 U.S.C. 154(b) by 0 days.

(21) Appl. No.: 09/430,512

(22) Filed: Oct. 29, 1999

(51) Int. Cl.[7] .................................................... H04L 12/44
(52) U.S. Cl. ............................ 370/433; 370/437; 370/465
(58) Field of Search ..................................... 370/431, 433, 370/437, 438, 439, 442, 443, 444, 445, 446, 447, 449, 450, 451, 454, 468, 461, 400, 408, 422; 709/223, 224, 225, 226, 227, 228, 229

(56) References Cited

U.S. PATENT DOCUMENTS

| 4,063,220 | 12/1977 | Metcalfe et al. . |
|---|---|---|
| 4,628,311 | 12/1986 | Milling . |
| 5,430,732 | * 7/1995 | Lee et al. . |
| 5,576,702 | 11/1996 | Samoylenko . |
| 5,687,175 | 11/1997 | Rochester, Jr. et al. . |
| 5,699,515 | 12/1997 | Berkema et al. . |
| 5,706,274 | 1/1998 | Angelico et al. . |
| 5,784,569 | * 7/1998 | Miller et al. . |
| 5,844,900 | * 12/1998 | Hong et al. ......................... 370/342 |

* cited by examiner

Primary Examiner—Huy D. Vu
(74) Attorney, Agent, or Firm—Coudert Brothers

(57) ABSTRACT

An Adaptive universal multiple access (AUMA) apparatus and method for collision-free, high efficiency multiple access to a shared media uses a corrector to control access to ports in a hub. The corrector assigns each node an active or passive state and subdivides each transmission cycle into NA sub-cycles, where NA is the number of active nodes in the network. The corrector is configured so that each active node is accessed during one sub-cycle.

AUMA may be implemented in repeaters, head-ends, or network interface cards in wired, or wireless networks. To provide efficient utilization AUMA has several mechanisms of automatic adaptation to network topology, lengths of media, node activity, bursty traffic, and speed of transmission. AUMA is compatible with standard Ethernet and can be used in Ethernet environment, including mixed networks, where some nodes are UMA nodes, and the other are standard Ethernet nodes.

23 Claims, 20 Drawing Sheets

2.5.1.1.1.1. X-Y-Z POSITION 2.5.1.1.1.2. X-Y-Z POSITION 2.5.1.1.1.3. X-Y-Z POSITION 2.5.1.1.2. STAR TOPOLOGY

ARTIFICIAL CRS OPTIONS

1. LONG PREAMBLE (LP)

APPROXIMATE MAXIMUM:

LP max = (96 + 512) ' (N-L) bits

N = 128

LPmax = 77216 bits (7.7 ms for 10 Mbps
0.77 ms for 100 Mbps)

2. SEQUENCE OF PREAMBLES (SP) - IF LP IS UNACCEPTABLE

SG - SHORT GAPE (4-8 Bits)

3. SEQUENCE OF WRONG PACKETS (SWP) - IF LP and SP are unacceptable

WRONG PACKET - ANY PACKET, HAVING NOBODY'S ADDRESS, WRONG CRC, E

ADAPTIVE UNIVERSAL MULTIPLE ACCESS

This application claims the benefit of Disclosure Document No. S00613, entitled "Adaptive Universal Multiple Access," submitted by Stanislav I. Samoylenko on Nov. 4, 1997 with a PTO stamped date of receipt of Nov. 12, 1997.

The teachings of U.S. Pat. No. 5,576,702, entitled "Method and Apparatus For Fault Tolerant Transmission In Multi-Channel Networks," issued Nov. 19, 1996 to the inventor of the present application, are also hereby incorporated by reference.

FIELD OF THE INVENTION

The present invention generally relates to a multi-station data network where multiple devices share some common resources, such as communication media and data-processing systems, switching systems. More precisely, the present invention is directed to an apparatus and method for collision-free multiple access in data networks which also adapts to varying traffic, varying number of active stations, variable channel distances, and variable transmission speed in the channels. Potential applications of the present invention include cabled, wired or wireless networks for collision-free, real-time, multimedia applications in the following areas: Ethernet LANs, wireless LANs and MANs, intra-chip communications, packet data on cellular networks, packet voice on LANs and MANs, interactive TV home-access networks, high-speed Internet access networks, mobile Internet access via cellular networks, and network computers.

BACKGROUND OF THE INVENTION

A multi-station data network includes a plurality of stations connected to a common medium for communication. Communication networks usually have many variable parameters, such as changing station activity, varying average load, and bursty traffic. Additionally, from time to time the network topology may be changed. For example, new modes and channels can appear, some nodes can be switched off, some channels can be interrupted, and channel speed or length may change.

Communication networks commonly operate under changeable conditions. For example, network load, nodes activity, network topology, inter-node distances, channel speed and other network parameters typically change with time. Bursty traffic is transmitted in many networks. While some nodes have long sequences of packets other nodes have no messages at all. New stations or hubs can be added in the network. For example, some nodes can be permanently or temporarily switched off, channel or node failures can change network topology, etc. Network load and traffic are, in general, random variables whose average value depends on the time of day, day of week, etc. Even in stable networks, it is desirable to use adaptive mechanisms at the time of network initialization to implement plug-and-play technology or in order to simplify network management.

To coordinate transmission over a common medium by the stations of the network, communications on the network typically follow a prescribed multiple access technique or protocol. Such protocols determine the sequence of actions to be performed by each station to avoid or reduce the impact of interference arising from transmission of other stations.

Multi-station networks may have different topologies. Common topologies include the multi-hub network shown in FIG. 1. FIG. 1 is a prior art network topology comprising a plurality of hubs 10, a plurality of stations 15 and a plurality of full duplex channels 11 for inter-node communication. FIG. 2 shows a prior art head-end networks topology comprising a head end 20, two unidirectional wired or wireless channels for transmitting from the head-end to station 21, and from the stations to the head-end 22. FIG. 3 shows a prior art wired or wireless bus-topology network, comprising a set of stations 35, interconnected each other by a bi-directional channel 30. Data transmission in the networks shown in FIGS. 1–3 is coordinated by a multiple access technique or protocol which determines the sequence of actions to be performed by each node to avoid or reduce the impact of interference due to transmission by other nodes.

Conventional communication protocols and multiple access techniques have the common drawbacks that they do not provide an efficient means for collision-free data transmission with automatic adaptation to changing network conditions. This reduces the potential network efficiency because in common network situations there is random network traffic and node activity, variable distances between nodes, and variable data transmission speed.

Networks with a ring topology commonly use a token-ring multiple access. Networks based on a bus topology sometime use a token-bus multiple access. Token access techniques for networks with bus topology (such as that described by IEEE standard 802.4) or ring topology (such as that described by IEEE standard 802.5 or FDDI) are collision free but they require transmission of control information (tokens) from one network station to another. When the token is distorted a complex token-recovery procedure has to be performed, what is the major limitation of token access techniques. Access management procedures in local area networks with token access are comparatively complicated and implementation of such networks requires high investments.

To avoid collisions in high-speed local area networks the Demand Priority Protocol (DPP) was proposed for the IEEE 802.12 standard. This protocol is applicable in networks with star or tree topology consisting of one or more interconnected hubs and a plurality of network stations connected to the hubs. The hubs perform a round-robin poll to all connected stations or lower-level hubs.

While the DPP protocol is collision-free, one drawback of the DPP protocol is that the implementation of a polling algorithm tends to cause a loss of network throughput. This is because in large multi-level tree networks the protocol tends to be complex and requires a correspondingly complex network management system. Moreover, the DPP algorithm cannot be implemented on a conventional network with a bus topology. The polling technique of the DPP protocol requires all network nodes to be polled in each polling cycle. A major drawback of the DPP algorithm is that it does not automatically adapt for changes in node activity, network distances, or speed of transmission.

Networks which rely on the bus topology commonly use the Carrier Sense Multiple Access with Collision Detection (CSMA/CD) protocol. An example of the CSMA/CD protocol is disclosed in U.S. Pat. No. 4,063,220 issued on Dec. 13, 1988 to Metcalfe, et al. In accordance with the CSMA/CD protocol, whenever any network station has a packet for transmission, it senses the communication medium, and if the medium is quiescent, the packet is impressed on the network. If the medium is engaged, the station waits and transmits its packet when it detects that the medium is idle. In view of the signal propagation delay in the medium, it is possible that two or more stations may start transmitting on the medium almost simultaneously. These transmissions may become scrambled and a collision may appear in the network. Any packets that have collided must be retransmitted. While the CSMA/CD protocol does facilitate the successful transmission of data between network stations, a considerable amount of time and medium throughput is lost whenever a collision occurs. Collision probability increases with traffic load, transmission rate or network length. An increased collision probability results in a longer packet transmission delay. Consequently, the CSMA/CD protocol can not be used for real-time transmission of multimedia information. Moreover, the CSMA/CD protocol does not have any means for adaptation to network traffic, node activity, network distances or speeds of transmission.

One technique to improve the efficiency of CSMA/CD is disclosed in U.S. Pat. No. 4,628,311, issued Dec. 12, 1986 to Milling. The technique of U.S. Pat. No. 4,628,311 assigns to each station an access window within a predetermined response period after the medium becomes idle. To distribute transmission capacity among the stations the access windows assigned to all stations are rotated to give all stations essentially equal access to the medium. Although this protocol is entitled Carrier-Sense Multiple-Access with Collision Avoidance (CSMA/CA), the inventor believes that the CSMA/CA protocol is unable to eliminate collisions altogether. The CSMA/CA protocol requires transmitting access control information to rotate the access windows. To achieve that, each frame has to contain in its header a window rotation control field. When a frame is distorted by unavoidable transmission errors, the network stations lose window rotation control information, which may lead to collisions. There are also other drawbacks to CSMA/CA protocol. Since the frame header has to be modified, a CSMA/CA network cannot use standard frame formats such as the Ethernet format. Additionally, the CSMA/CA protocol does not provide any means for adaptation to changing network conditions.

Another collision avoidance scheme which assigns to each station an access window for determining the beginning of transmission after the medium becomes idle is disclosed in U.S. Pat. No. 4,799,052, issued Jan. 17, 1989 to Near, et al. According to the teachings of U.S. Pat. No. 4,799,052 the time period between the instant the medium is released and the access window of a given station depends on the station's unique medium address number and also upon the medium address number of the station which was the last to transmit before the medium became idle. However, this method also requires access control information to be passed in the network to determine whether or not a given station may send its packet. This information defines the medium address number of the station, which is transmitting a frame. All frame headers must therefore have to include a special control field for the medium address number of the transmitting station. Similar to the previous scenario, standard frames such as the Ethernet frame cannot be used with this frame format. Moreover, as in the previous scenario, the receiving station loses access control information if the frame is distorted in transmission, and recovery requires a special procedure. The method of U.S. Pat. No. 4,799,052 does not provide any means for adaptation to current state of the network.

U.S. Pat. No. 5,576,702, issued Nov. 19, 1996 to Samoylenko, provides a means for collision-free, Ethernet-compatible multiple access without transmitting any access control information in data frames. However, a drawback of the method of U.S. Pat. No. 5,576,702 is that it does not have any mechanism for automatic adaptation to a current state of the network.

U.S. Pat. No, 5,687,175, entitled "Adaptive time division multiplexing communications protocol method and system" issued Nov. 11, 1997 to Rochester, et al., a communication protocol for collecting data from remote sensors via a wireless network is disclosed. The protocol disclosed in U.S. Pat. No. 5,687,175 uses a two-step polling technique. During the first step, the polling device simultaneously polls all remote stations enabling them to transmit their unique identifiers, if they need to transmit data. In response, those stations which have data, transmit their ID using a random access protocol. During the second step, the polling node polls the remote stations which have successfully transmitted their ID during the first step.

The two-step polling protocol of U.S. Pat. No. 5,687,175 has the drawback that it doesn't provide a high medium capacity utilization. This is because the high overhead of the two-step poling protocol reduces the medium capacity utilization. Another drawback is that real time data transmission may not be possible in some cases. This is because of the collisions that may occur which are associated with the random access during the first step of polling. The two-step polling protocol technique can not be used for high-efficiency, real-time transmission that adapts to variable traffic, distances, and speed of transmission.

U.S. Pat. No. 5,706,274 "CSMA with dynamic persistence" issued Jan. 6, 1998 to Angelico, et al., discloses a method for dynamically determining a persistence value, P, to increase capacity utilization of a media in a P-persistent Carrier Sense Multiple Access networks. While the method of U.S. Pat. No. 5,706,274 can be used for dynamic optimization of P and increasing the capacity utilization, it is not a collision-free technique, has a comparatively low capacity utilization and can not be used for real-time transmission.

U.S. Pat. No. 5,699,515 "Backoff scheme for access collision on local area network" issued Dec. 16, 1997 to Berkema et al., uses dynamic adaptation to the network load via variable random delay of transmitting packets. Each packet before transmission is delayed by a random delay value, selected from a variable backoff value. If during the delay, a packet from another node appears, or a collision occurs, the backoff value is increased. If a packet is transmitted successfully, the backoff value is decreased. The method of U.S. Pat. No. 5,699,515 presents a means for dynamic adaptation to some network variables; but it does not provide high-efficient collision-free transmission. Additionally, the method of U.S. Pat. No. 5,699,515 does not provide any means for adaptation to network distances or speed of transmission.

Conventional protocols and access methods have many drawbacks. They cannot be used for constructing collision-free, real-time multiple-access networks that have a limited latency and which provide high capacity utilization in variable network environments by dynamic adaptation to the network topology, traffic, transmission speed and channel lengths. Common collision-free MAC protocols (like token-ring, token-bus, polling etc.) have no means for adapting to the node activity, and cannot optimize MAC procedures to adjust to the current state of the network. Conventional collision-free protocols do not have a mechanisms for adaptation to bursty traffic, and therefore have a loss of capacity utilization; and hence an increase of the latency. Consequently, such protocols have some loss of capacity utilization, and, therefore, increase of latency.

What is desired is a high efficiency, collision-free multiple access method, which provides multiple access control with automatic adaptation to current network parameters.

SUMMARY OF THE INVENTION

The present invention is directed towards a collision-free media access control protocol, which has automatic mechanisms for dynamic adaptation to variations in network parameters. A goal of the present invention is a collision-free multiple access control technique which has includes mechanisms for automatic adaptation to network node activity, bursty traffic, changes of network topology, channel length and speed of transmission.

It is therefore an object of the present invention to provide a collision-free multiple access apparatus and method, which increases network capacity utilization decreases latency, and reduce network management complexity by using automatic adaptation to variable network topology, nodes activity, network load, bursty traffic, network distances and speed of transmission.

It is another object of the present invention to provide a method to accomplish adaptive, collision-free, real-time packet transmission in different types of wired or wireless networks, including multi-hub networks, head-end networks, networks having star, tree or bus topology.

It is yet another object of the present invention to provide an adaptive access control method with no need for special access control information transmission in data frames. A preferred embodiment uses any standard frame format such as Ethernet or ATM formats, and is compatible with the standard Ethernet multiple access method.

It is still yet another object of the present invention to provide an adaptive multiple access method, which can be simple implemented in different network nodes, for example, in network adapters without any change of standard, for example Ethernet hubs; in network hubs without change of standard adapters, in network head-ends, etc.

Figure 1:
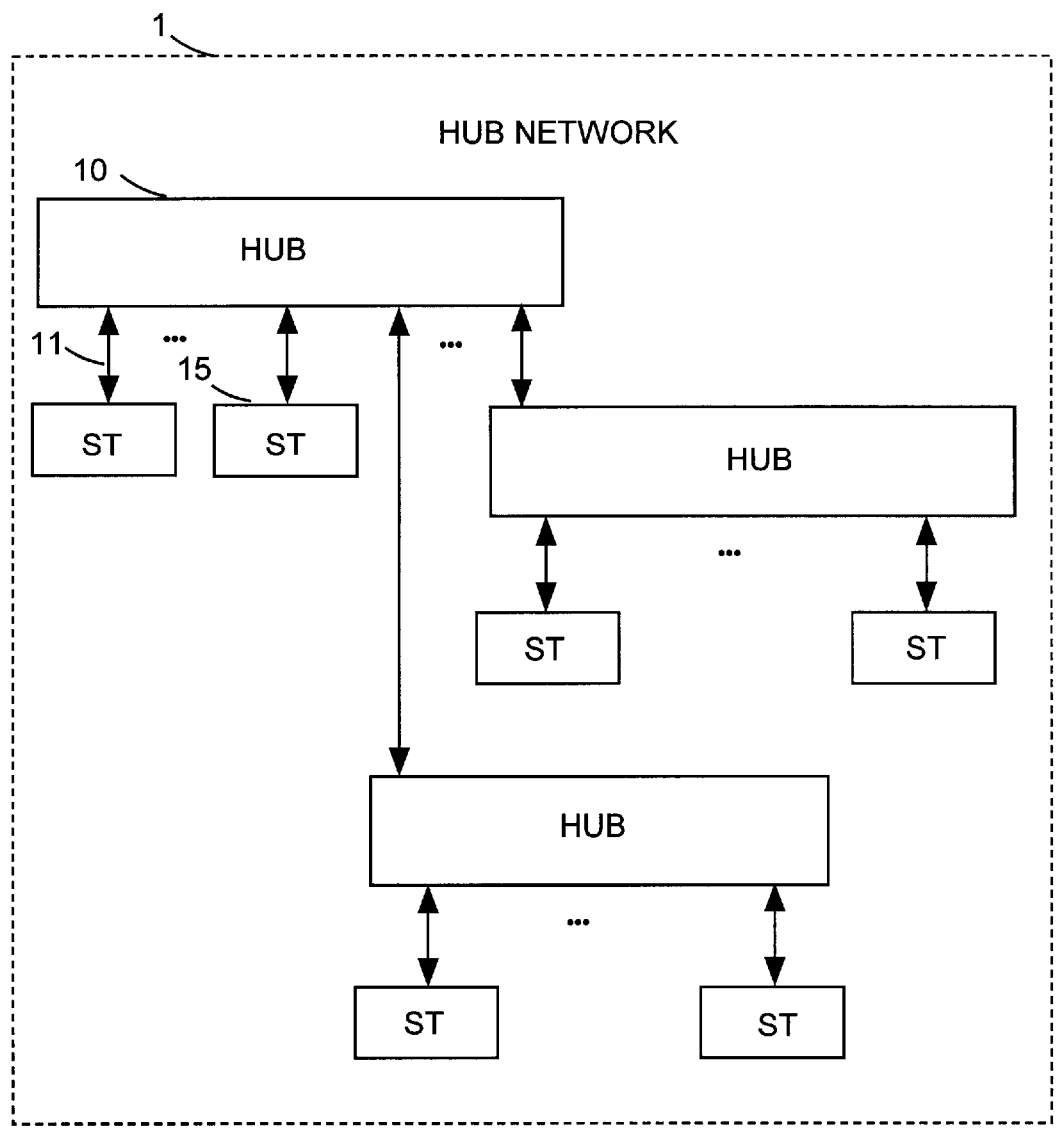
FIG. 1 is an illustration of a prior art hub network.

A partial list of the elements shown in FIGS. 1–14 includes the following elements:

- 1 hub network
- 2 head-end network
- 3 bus network
- 10 hub
- 11 medium of 1
- 15 hub network station: a node of 1
- 20 head end: a node of 2
- 21 downward channel: a medium of 2
- 22 upward channel: a medium of 2
- 25 head-end network station: a node of 2
- 30 bus: a medium of 3
- 35 bus network station: a node 3
- 100 adaptive multiple access hub
- 110 repeater: a component of 100
- 111, 114, 117 output links of 110 for transmitting data signals DO0, DO1, ... DOZ designated to the ports 0, 1, ... Z, respectively (where Z=N−1, N is a number of ports in 100)
- 112, 115, 118 input links of 110 for data signals DIU0, DIU1, ... DIUZ receiving from the ports 0, 1, ... Z, respectively
- 120 interface: a component of 100
- 121, 124, 127 output links of 120 for transmitting data signals DOU0, DOU1, ... DOUZ designated to the ports 0, 1, ... Z, respectively
- 122, 125, 128 input links of 120 for receiving data signals DI0, DI1, ... DIZ from ports 0, 1, ... Z, respectively
- 150 corrector: a component of 100
- 151, 154, 157 input links of 150 for receiving from 120 carrier sense signals CR0, CR1, ... CRZ, relating to ports 0, 1, ... Z, respectively
- 152, 155, 158 output links of 150 for transmitting to 120 control signals CL0, CL1, ... CRZ, relating to data input signals on the links 112,
- 115, 118 from the ports 0, 1, ... Z, respectively 153, 156, 159 output links of 150 for transmitting to 120 control signals AW-, AW1, . . . AWZ, relating to output signals on the links 121, 124, 127 to the ports 0, 1, . . . Z, respectively 161 input control signal of 150 (UMA) to define a mode of operation (UMA/Ethernet)

162 input control signal of 150 (FAST) to define a speed of transmission (10/100 Mbps)

210, 211, 212 logical ANDs, components of 120, to control transferring of data input signals DI0, DI1, . . . DIZ, respectively 220, 221, 222 logical ANDs, components of 120, to control outputting of artificial signals (AS), generated by 250, to output ports 0, 1, . . . Z, respectively.

230, 231, 232 logical ORs, components of 120, to combine signals for the output ports 0, 1, . . . Z, respectively.

240, 241, 242 detectors (DET) of carrier signals on the input ports DI0, DI1, . . . DIZ, respectively 250 generator of artificial signals (AS)

251 connecting link between 250 and 220, 221, 222

261, 262, 263 connecting links between 220 and 231, 232, 233, respectively 270, 271, 272 detectors (DET) of output data signals DO1, DO1, . . . DOZ, respectively 310, 320 port controllers (PORTCONTR0 and PORTCONTRZ), components of 150 for the ports 0, . . . Z, respectively 311, 321 output links of 310 and 320 for sending inter-frame gap start signals (IFGS0 and IFGSZ), respectively 312, 322 output links of 310 and 320 for sending access window start signals (WINDS0 and WINDSZ), respectively 314, 324 output links of 320310 and 320 for sending signals CAND0 and CANDZ, respectively 315, 325 output links of 310 and 320 for sending signals decreasing the number of active nodes (NAMIN0 and NAMINZ), respectively 316, 326 output links of 310 and 320 for sending sync-signals (SS0 and SSZ), respectively 317, 327 output links of 310 and 320 for sending initiating signals INIT0 and INITZ, respectively 319, 329 output links of 310 and 320 for sending signals indicating the start of a frame (FRS0 and FRSZ), respectively 330 general server (GENSERV), a component of 150

331 output link of 330 for sending signals indicating the end of the access window (WINDE)

332 output link of 370 for sending synch-signals (SSC)

333 output link of 330 for sending signals indicating the frame reception flag (FRF)

334 output link of 330 for sending signals indicating the end of the inter-frame gap (IFGE)

335 output link of 330 for sending signals indicating the number of active nodes (NA)

336 output link of 330 for sending signals indicating the selected node (SEL)

340 N-input logical OR (NAMIN), component of 150, to combine signals NAMIN0, NAMINZ 341 output link of 340 for transmitting signals NAMINT 350 N-input logical OR (WINDS), a component of 150, to combine signals WINDS0, . . . WINDSZ 351 output link of 350 for transmitting signals WINDST 360 N-input logical OR (IFGS), component of 150, to combine signals IFGS0, . . . IFGSZ 361 output link of 360 for transmitting signals IFGST 365 N-input logical AND (INIT_AND), component of 150, for signals INIT0, . . . INITZ 366 output of 365 for transmitting signals INITA 370 N-input logical OR (SSC), component of 150, to combine signals SS0, . . . SSZ 371 output link of 370 for transmitting signals SSC 380 N-input logical OR (FRS), component of 150, to combine signals FRS0, FRSZ 381 output link of 380 for transmitting the signal FRST 385 N-input logical AND (CAND), component of 150, for signals CAND0, . . . CANDZ 386 output of 385 for transmitting signals CANDT 410 current access number controller for the port Z (CANCOUNT Z); (The value of Z can be equal to 0, 1, . . . N−1, N is the number of ports in a hub)

411 output link of 410 for transmitting the current access number of port Z (CANZ)

420 access window controller for the port (AWCONTR Z)

430 IAN register for the port Z (IANZRG), containing the initial access number of port Z (IANZ)

431 output link of 430

510 window controller (WINDCONTR), a component of 330

520 frame controller (FRCONTR), a component of 330, a component of 330

530 selector of opening current access numbers (SELECTOR), a component of 330

540 controller of the number of active ports (NACONTR), a component of 330

550 time slot register (TSRG), a component of 330, containing time slot values (AW100SH, AW10SH, AW100L, AW10L)

551 output link of 550

560 inter-frame gap register (IFGRG), containing inter-frame gap values (FG100, IFG10)

561 output link of 560

570 minimum frame length register (FRMINRG), containing the minimum frame counts (FR100, FR10)

571 output link of 570

280 number of ports register (NAG), containing the number of ports value (N)

581 output link of 580

610 START state of 420

611 reset signal for 420 (RST)

612 transition from 610 to 640, when RST=0

620 CANSH state of 420

621 unconditional transition from 620 to 660

630 PASS_OP state of 420

631 transition from 630 to 640, when SSC=1

632 transition from 630 to 635, when CR=1

635 SSCGEN state of 420

636 unconditional transition from 635 to 640

640 INIT state of 420

642 transition from 640 to 645, when UMA=0

643 transition from 640 to 648, when (UMA=1 and INITA=1)

645 ETH state of 420
646 transition from 645 to 640, when UMA=1
650 EFGSTART state of 420
651 transition from 650 to 640, when CR0=1
652 transition from 650 to 6 10, when IFGE=1
660 ACTCL state of 420
662 transition from 660 to 670, when CAN=SEL
663 transition from 660 to 640, when SSC=1
670 ACTOP state of 420
671 transition from 670 to 675, when (CR=1 and WINDE 00 and LDF=1)
672 transition from 670 to 630, when (CR=0 and (WINDE=01 and LDF=0 or WINDE=11))
674 transition from 670 to 680, when (CR=1 and (WINDE=00 and LDF=0 or WINDE=01))
675 LDFRES state of 420
676 unconditional transition from 675 to 680
680 ACTRX state of 420
682 transition from 680 to 690, when (CR=0 and FRF=1)
683 transition from 680 to 670, when (CR=0 and FRF=0)
690 RXPAUSE state of 420
691 transition from 690 to 680, when CR=1
710 INIT state of 410
711 transition to 710, when reset (RST)
712 unconditional transition from 710 to 730
730 CANCOUNT state of 410
732 transition from 730 to 750 when (NAMINT=1 and CAN>SEL)
733 transition from 730 to 710 when SSC=1
810 WAIT state of 520
811 transition to 810, when reset (RST)
812 transition from 810 to 820 when FRST=1
820 FRCOUNT state of 520
821 transition from 820 to 840 when CLK=1
822 transition from 820 to 810 when (IFGST=1 or SSC=1)
823 transition from 820 to 830 when (CNT=FR10 and FAST=0 or CNT=FR100 and FAST=1)
830 FREND state of 520
831 transition from 830 to 810 when (WINDST=1 or SSC=1)
840 CNTINCR state of 520
841 unconditional transition from 840 to 820
910 STAR state of 530
911 transition to 910, when reset (RST)
912 transition from 910 to 920, when (SSC=0 and RST=0)
920 SECOUNT state of 530
921 transition from 920 to 930, when (SSC=0 and (CANDT=0 or FRF=1 and IFGE=1))
922 transition from 920 to 910 when SSC=1
930 SELINCR state of 530
931 transition from 930 to 910 when SEL=NA
932 transition from 930 to 920 when SEL<NA
1000 WAIT state of 510
1001 transition to 1000, when reset (RST)
1002 transition from 1000 to 1010 when WINDST=1
1003 transition from 1000 to 1030 when IFGST=1
1010 WINDCNT state of 510
1011 transition from 1010 to 1000, when (SSC=1 or FRST=1)
1012 transition from 1010 to 1050, when (CNT=AW10L or CNT=AW100L and FAST=1)
1014 transition from 1010 to 1040, when (SSC=0 and CLK=1)
1015 transition from 1010 to 1020, when (CNT= AW10SH or CNT=AW100SH and FAST=1)
1020 SHWEND state of 510
1021 unconditional transition from 1020 to 1010
1030 IFGCOUNT state of 510
1031 transition from 1030 to 1040, when (SSC=0 and CLK=1)
1032 transition from 1030 to 1060, when (CNT=IFG10 or CNT=IFG100 and FAST=1)
1033 transition from 1030 to 1000, when (SSC=1 or FRST=1 or WINDST=1)
1040 CNTINCR state of 510
1041 transition from 1040 to 1030, when FL=0
1042 transition from 1040 to 1010, when FL=1
1050 LWEND state of 510
1051 unconditional transition from 1050 to 1000
1060 IFGCEND state of 510
1061 unconditional transition from 1060 to 1000
1100 START state of 540
1101 transition to 1100, when reset (RST)
1102 transition from 1100 to 1110, when (SSC=0 or RST=0)
1110 NACOUNT state of 540
1111 transition from 1110 to 1100, when (SSC=0 or NAMINT=1)
1112 transition from 1110 to 1120, when SSC=1
1120 NADECR state of 540
1121 unconditional transition from 1120 to 1110

DETAILED DESCRIPTION OF THE INVENTION

Briefly, the present invention comprises a method and apparatus for controlling access on a communication network having a plurality of nodes and a communication media for transferring data. For example, in every communication network at a given time some nodes are active (are switched on and have data for transmission) and other nodes are passive (are switched off or have no data for transmission at this time). After some period of time, the situation may change: some active nodes become passive, and/or some passive nodes become active. In many networks, traffic is bursty: in each station, long messages are interleaved with long idle periods. In this case, at any given time, if the network is not overloaded, only a small proportion of stations simultaneously have data for transmission while all other stations are idle. The present invention provides a technique for adaptation to bursty traffic.

The present invention is also directed to addressing the problems caused by changing network topology. Most communication networks periodically have intentional or unintentional (due to failures) changes of network topology. For example, new hubs or stations can be connected to a network, or disconnected from the network. After each change of topology, the network must be initialized. New networks must be initialized prior to use. This initialization is typically associated with a lot of managerial work. The present invention provides a means for automatic initialization, which can be used to simplify or to exclude the managerial work associated with changing network topology.

The present invention is also directed to the problem of automatic adaptation to changing channel length. In most hub networks, inter-node hub-to-hub or hub-to-station channels have different length; some channels are short; and others can be much longer. To optimize capacity utilization and decrease latency it would be very useful to have means for automatic adaptation of MAC procedure to real network length. The present invention suggests such mechanism.

Additionally, the present invention is directed to the problem of variable channel speeds. In the same network, different channels can have different speeds. Sometime the speed of an existing channel can be changed. Therefore, it would be very useful to have an automatic mechanism, which will adapt MAC procedure to real speeds of transmission in network channels.

Figure 4:
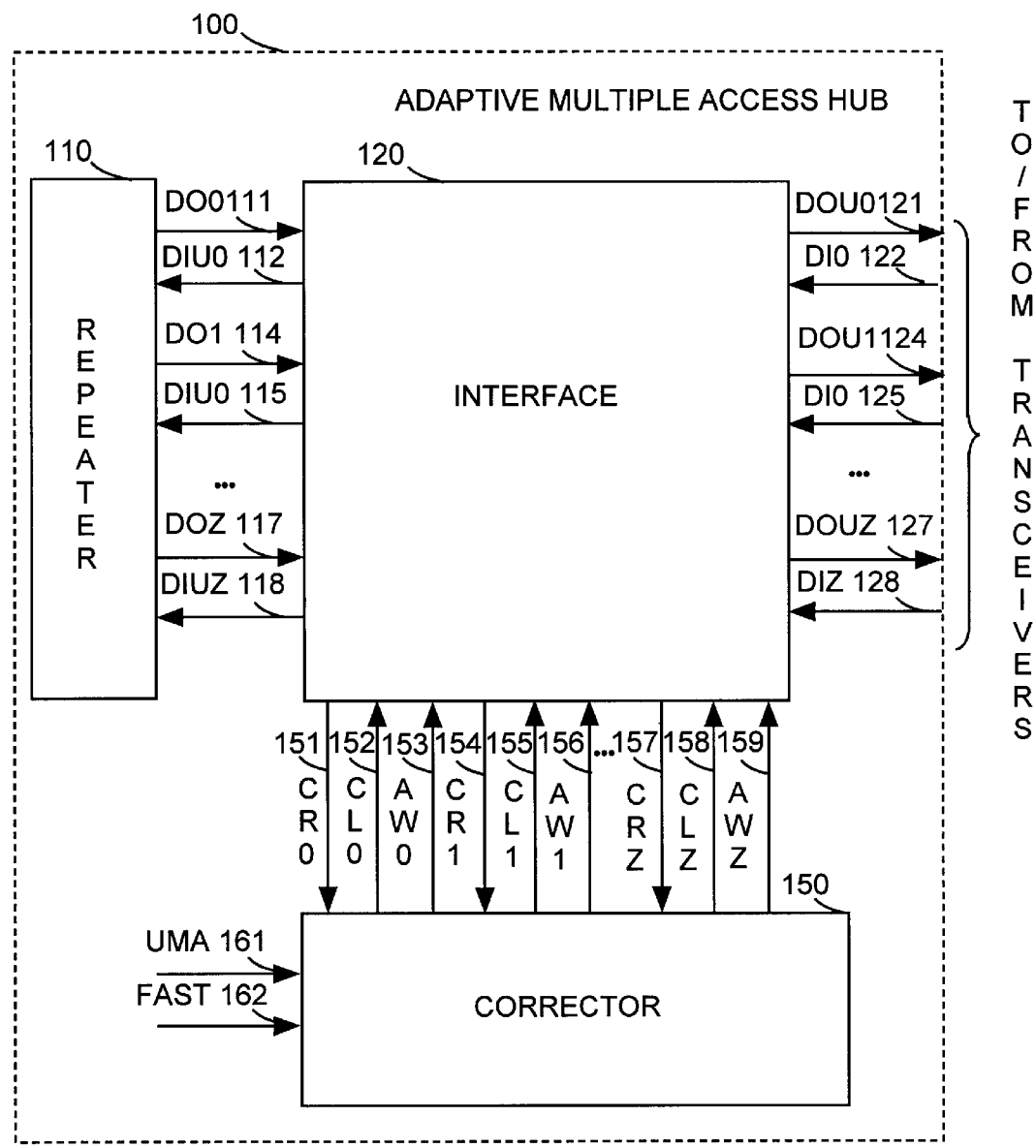
FIG. 4 is a block-diagram of an adaptive multiple access hub (AMA hub), of the present invention.

FIG. 4: Adaptive Universal Multiple Access Hub

The present invention includes an adaptive universal multiple access (A-UMA) apparatus and method. FIG. 4 illustrates a general structure of an inventive adaptive multiple-access hub 100 for practicing the inventive AUMA method. One objective of adaptive multiple access hub 100 is to provide efficient, collision-free transmission of data between stations connected to the hub. The hub 100 performs the following four principal functions:

1) The hub controls transmission from the stations to the hub, enabling at any given time data transmission from no more than one station. Such control preferably permits collision-free multiple access of the stations to the hub.
2) The hub repeats data received from a transmitting station to all other stations.
3) The hub observes the activity of the stations and automatically adapts transmission control to the current activity of the stations. This facilitates the efficient use of network capacity when not all of stations are active at a given time or are transmitting bursty traffic.
4) The hub monitors propagation the delay and response time of the stations and automatically adapts to current distances between the hub and different stations and to their response time. This provides efficient use of network media in networks with different distances between the hub and the stations, especially in networks with movable stations.

Hub 100 includes three main components: A repeater 110, an interface 120, and a corrector 150. Repeater 110 may include a variety of conventional repeaters known by those of ordinary skill in the art. However, as described below in more detail, the inventor has developed a preferred interface 120 and corrector 150 to implement the AUMA function.

The repeater 110 and the interface 120 are interconnected by Z groups of links associated with appropriate signals transmitted via the links. Output links 111, 114, and 117 are for transmitting data signals DO0, DO1, . . . DOZ designated to the ports 0, 1, . . . Z, respectively (where Z=N−1, N is a number of ports in 100). Input links 112, 115, 118 are for data signals DIU0, DIU1, . . . DIUZ received from the ports 0, 1, . . . Z. respectively. Each group of links transmits two types of signals. Signals DO0 111, DO1 114, . . . DOZ 117 are output data transmitted from the repeater 110 to the interface 120. Signals DIU0 112, DIU1 115, . . . DIUZ 118 are input data transmitted from the interface 120 to the repeater 110 under control of the corrector 150.

The interface 120 and transceivers are interconnected by Z groups of links, each group transmitting two types of signals. Output links 121, 124, 127 transmit data signals DOU0, DOU1, . . . DOUZ designated to the ports 0, 1, . . . Z, respectively. Data input links 122, 125, and 128 are for receiving data signals DI0, DI1, . . . DIZ from ports 0, 1, . . . Z, respectively. Signals DOU0 121, DOU1 124, . . . DOUZ 127 are output data and control messages transmitting from the interface 120 to the transceivers. Signals DI0 122, DI1 125, . . . DIZ 128 are input data transmitted from the transceivers to the interface 120.

The interface 120 and the corrector 150 are interconnected by N groups of links where N in the number of ports. Each group has three types of signals. Signals CR0 151, CR1 154, . . . CRZ 157 are carrier sense signals, associated with the ports 0, 1, . . . Z, Z=N−1, transmitted from the interface 120 to the corrector 150. Signals CL0 152, CL1 155, . . . CLZ 158 are closing signals, transmitted from the corrector 150 to the interface 120 to control input data, associated with the ports 0, 1, . . . A. Signals AW0 153, AW1 156, . . . AWZ 159 are access window signals, transmitted from the corrector 150 to the interface 120, to control outputting data and control messages, associated with the ports 0, 1, . . . Z.

Corrector 150 preferably includes at least two control signals: signals UMA 161, and FAST 162. UMA 161 may be an input control signal to define a mode of operation, such as UMA/Ethernet. FAST 162 may be an input control signal to define the speed of transmission (e.g., 10/100 Mbps).

The behavior of the hub is controlled by corrector 150. The corrector 150, through the interface 120, can enable or disable transmission of each station connected to the hub by opening and closing the access windows of the hub. The access windows are controlled by the access window signals AW0 151, AW1 156, . . . AWZ 157. A port X, X=0, 1, . . . Z, is closed when the active window signal AWX is active (high), and the station X, connected to the port X is informed that the port is closed and the transmission is disabled.

Additionally, the corrector, using the closing signals CL0 152, CL1 155, . . . CLZ 158, controls all inputs of the repeater, enabling or disabling reception of data received from the appropriate ports. Input data DIX, receiving by a port X from the station connected to the port, is transferring to the port X of the repeater as the signal DIUX, only if the closing signal CLX, receiving from the corrector is inactive (low). If the closing signal CLX is active (high), the receiving signal DIX is discarded.

After initiating or resetting, the corrector 150 closes all input ports of the hub (all AW signals are active), and disables reception of data by all input ports of the repeater (all CL signals are active). Then the corrector starts to open sequentially, starting from port 0 through all input ports 0, 1, . . . Z.

The corrector 150 receives from interface 120 carrier sense signals CR0 151, CR1 154, . . . CRZ 157, that depend on input data signals DI0 121, DI1 125, . . . DIZ 128, respectively and which indicate which station (or stations) is transmitting at a given time.

Using this information, corrector 150 adaptively subdivides all hub ports into active and passive ports. Corrector 150 sequentially opens all active ports for a predefined access window duration each. (A port X is open for the station to which it is connected if the active window signal AWX is low, and it is open for the repeater if the closing signal CLX is low.) If the window of a port X is open both for the station connected and for repeater (CLX=0, and AWX=0) then if the station connected to the port X starts transmission, the duration of the window will be extended until the station finishes the transmission, and then the next port will be open. If no carrier is detected while a window is open (the connected station has no packets for transmission) the window will be closed after the predetermined window duration time, and the port state will be changed from active to passive. The next active port will then be open.

A passive port Y is open for the connected stations (AWY=0, no artificial closing signals are transmitted), but it is closed on the input of repeater 110 (CLY=1). If a passive port Y starts transmission, the receiving signals will be discarded, the port will be closed to the connected station (AWY will be changed from 0 to 1), and the state of the port will be changed from passive to active. In the active state the port will be open later, when its turn comes.

Figure 2:
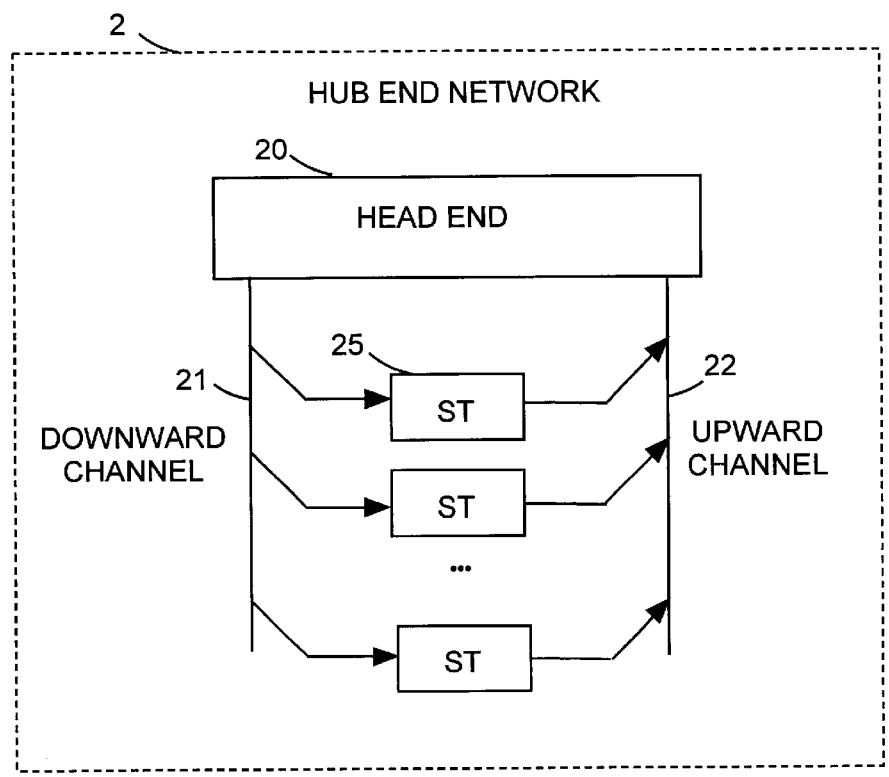
FIG. 2 shows an example of a network based on a prior art head end with unidirectional downward and upward channels.
Figure 3:
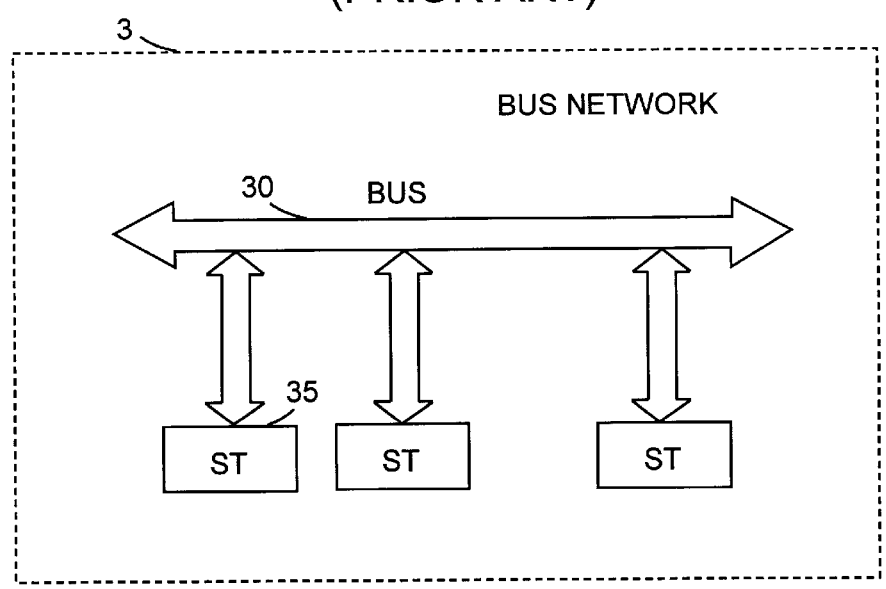
FIG. 3 is an illustration of a prior art bus network.

The method and apparatus of the present invention is applicable to a variety of different prior art network configurations, such as those shown in FIGS. 1–3. Networks based on hubs, like that shown in FIG. 1, have each station 15 connected to a hub by a dedicated channel. If the network has more than one hub the hubs are interconnected to each other using a tree topology. Hub networks include the standard 10Base-T Ethernet or 100 Base-T Fast Ethernet LANs. Head-end networks, such as that shown in FIG. 2, have unidirectional downward and upward channels. In this case each station 25 can transmit data to the head end 20 via the upward channel 22 and receive data from the head end via the downward channel 21. The head end retransmits data receiving from the upward channel to the downward channel and can transmit to each station control messages and additional data, if it is needed. Such networks can be cabled; as for example networks in which the downward and upward channels use different frequencies. Bus networks, such as that shown in FIG. 3 have all stations 35 communicating to each other directly via the shared bus media 30. The bus media can be a multi-wire bus, like a computer bus, or a coaxial cable, like the Ethernet coaxial cables, or a wireless channel, where all stations can hear each other.

Figure 5:
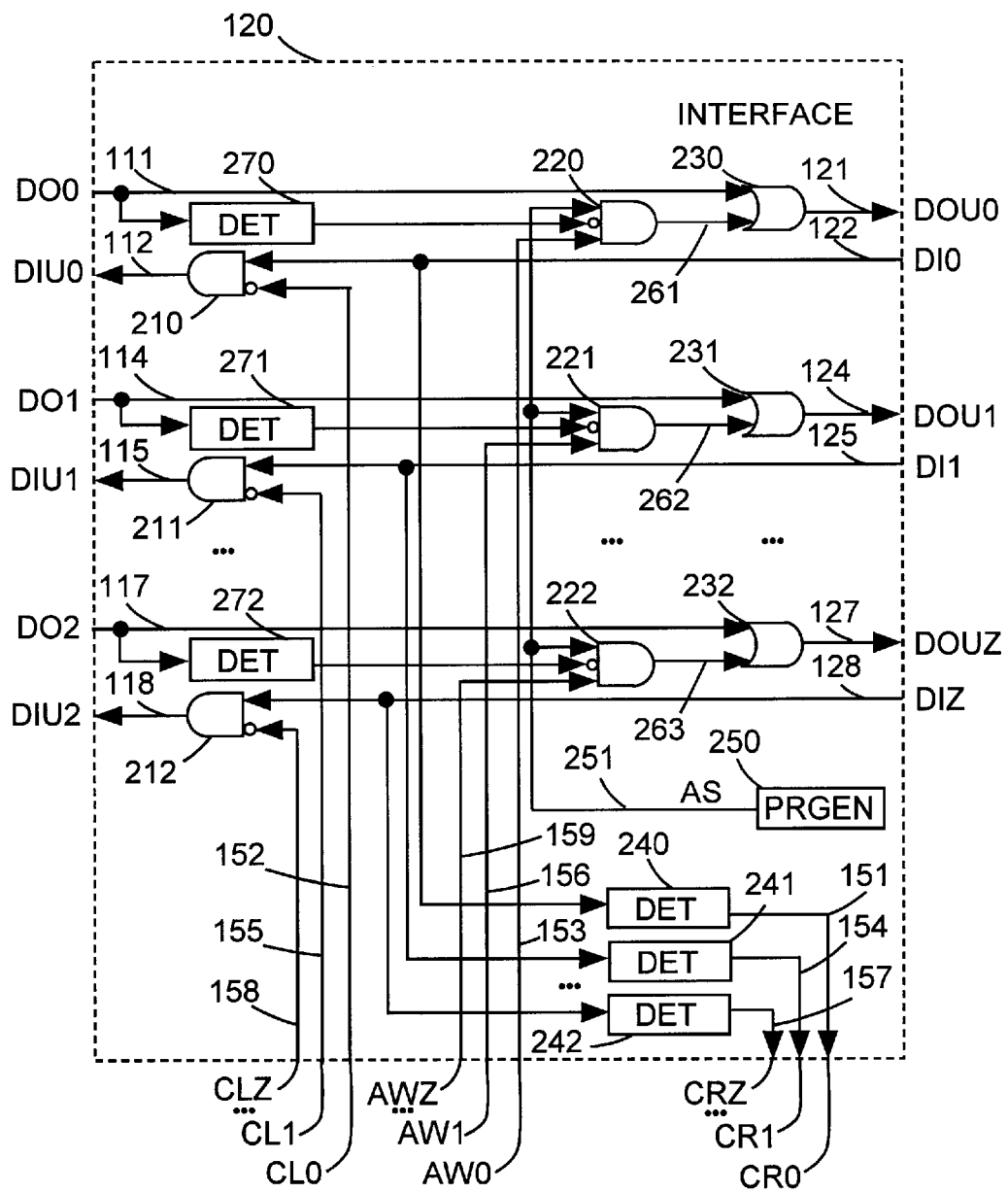
FIG. 5 is block diagram of a preferred embodiment of an interface component of the AMA hub shown in FIG. 4.

FIG. 5: Preferred Interface Element

The function of interface 120 of hub 100 could be implemented in many different ways. The general principles of interfaces are well known and do not need to be described in detail.

However, the inventor has developed a preferred implementation of interface 120 for use with hub 100. FIG. 5 is a schematic diagram of a preferred interface 120. Interface 120 includes Logical AND components 210, 211, 212 to control by the signals CO0, CL1, . . . CLZ the transfer of input data DI0, DI1, . . . DIZ from the links 122, 125, 128 to the links 112, 115, 118, respectively. Logical AND components 220, 221, 222 to control by the signals AW0, AW1, . . . AWZ trans of the artificial signal AS from the link 251 to the links 261, 262, 263, respectively. Logical OR components 230, 231, 232 to combine signals 111 and 261, 114 and 262, 117 and 263 for the outputs 121, 124, 127, respectively.

Block PRGEN 250 is a generator of artificial signal AS 251, which is used to prevent transmission from closed stations. For example, the AS signal may comprise an endless Ethernet preamble.

The blocks DET are used to the detect the presence of a signal on appropriate input signal DOX and access window signal AWX. Detectors DET 240, 241, . . . 242 detect carriers on the input links 122, 125, 128, respectively. Detectors DET 270, 271, . . . 272, to detect output signals on the links 111, 114, 117, respectively.

As illustrative examples of the operation of the detectors, if X=0, the output signal DOU0 is dependent on the following. When the input signal DO0 is not idle DET 270 will have high-level output, and get 220 will be closed, and output signal DOU0 121 will be equal to the input signal DO0 111. When DO0 111 is idle and access window for the port 0 is open (AW0=0), the output signal DOU0 will be idle. If DO0 111 is idle and the access window is closed (AW0=1), the output signal DOU0 will be equal to the artificial signal AS. An output signal DIUX, transmitted from interface 120 to port X of repeater 110 depends on the input signal DIX, received from a station connected to the port X, and the closing signal CLX If, for example, X=0, and CL0 152 is low (the input 0 is open), then DIU0 112 is equal to input the signal DI0 122. When the input is closed (CL0=1), the output signal DIO0 112 is idle.

FIGS. 6–8 and 10–14: Structure and Function of Preferred Corrector Element

Figure 6:
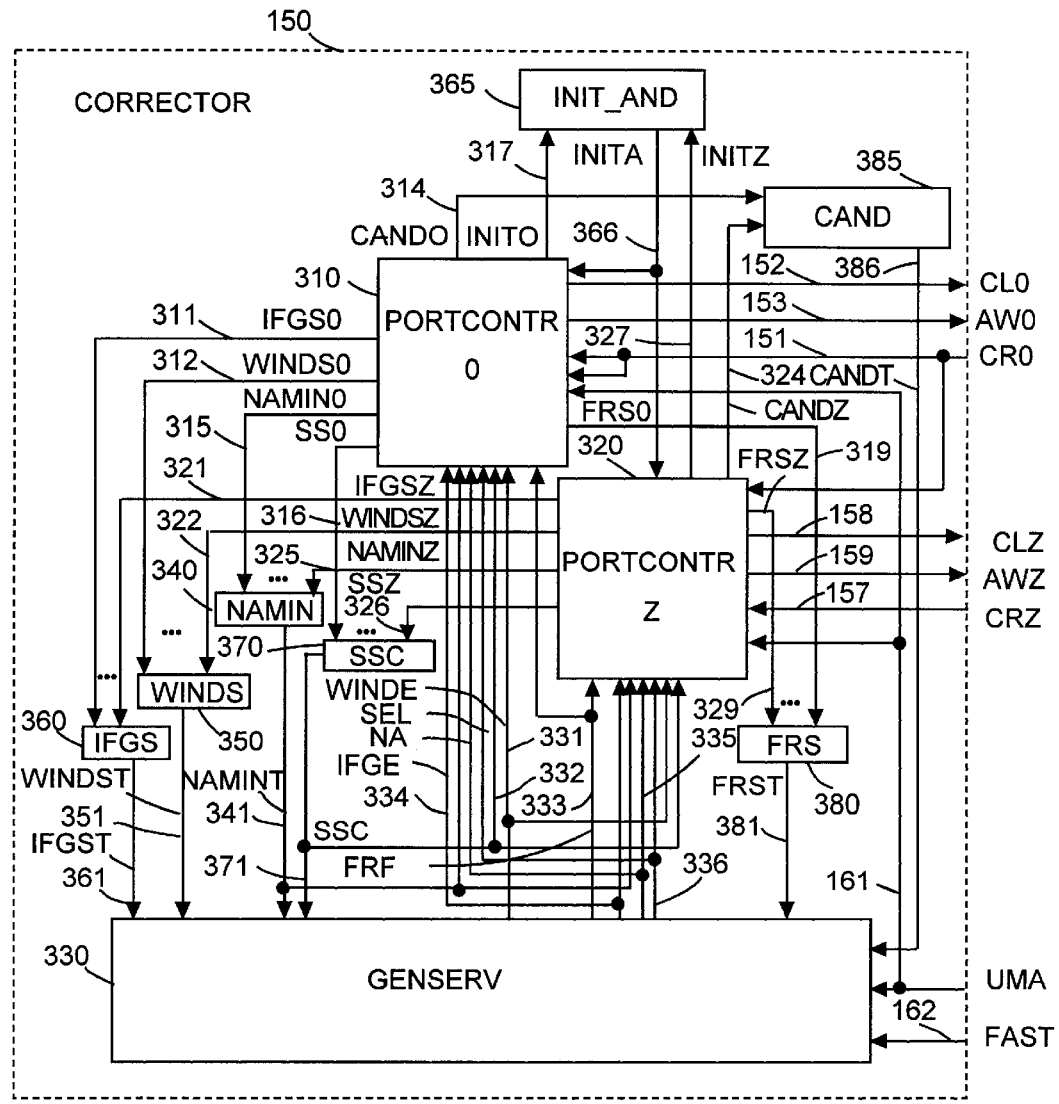
FIG. 6 shows a block diagram of a preferred embodiment of an AMA corrector component of the AMA hub shown on FIG. 4. The corrector includes N port controllers (PORTCONTR) for each port 0, 1, ... Z, where N is number of ports in an AMA hub, and Z=N−1. To simplify illustration, only two ports (0 and Z) are shown in FIG. 6.

The function of corrector 150 could be implemented in a variety of ways. However, the inventor has developed a preferred implementation of corrector 150. FIG. 6 illustrates a preferred embodiment of corrector 150. It preferably includes N identical port controllers (elements PORCONTR 0, 1, Z) for each port of the hub. For illustrative purposes, only two port controllers, PORTCONTR0 310 and port PORTCONTRZ 320, are shown in the FIG. 6.

GENSERVE 330 is a general server receiving inputs from elements IFGS 360, WINDS 350, NAMN 340, SSC 370, FRS 380, and CAND 385. There are N-input OR blocks IFGS 360 to combine signals IFGS0, . . . IFGSZ. The inputs of the N input OR blocks IFGS 360 are connected to N different PORTCONTRs for receiving signals IFGS0 311, . . . IFGSZ 321, respectively. The outputs IFGST 361 of each OR block IFGS 360 is connected to the GENSERV 330.

There are N-input OR blocks WINDS 350. The inputs of these blocks are connected to N different PORTCONTRs for receiving signals WINDS0 312, . . . WINDSZ 322, respectively. The output WINDST 351 of WINDS 350 is connected to the GENSERV 330.

There are N-input OR blocks FRS 380. The inputs of thes blocks are connected to N different PORTCONTRs for receiving signals FRS0 319, . . . FRSZ 329, respectively. The output of FRST 381 of FRS 380 is connected to the GENSERV 330.

There are N-input OR blocks NAMIN 340. The inputs of these blocks are connected to N different PORTCONTRs for receiving signals NAMIN0 315, . . . NAMINZ 325, respectively. The output of the block NAMINT 311 is connected to the GENSERV 330 and to each PORTCONTR.

There are N-input OR blocks SSC 370. The inputs of these blocks are connected to N different PORTCONTRs for receiving signals SSC0 316, . . . SSCZ 326, respectively. The output of 371 of SSC 370 is connected to the GENSERV 330 and to each PORTCONTR.

There are N input AND blocks CAND 385. The inputs of these blocks are connected to N different PORTCONTRs for receiving signals CAND0 314, and CANDZ 324, respectively. The output of the block CANDT 386 is connected to the GENSERV 330.

There are N-input AND blocks INIT_AND 365. The inputs of these block are connected to N different PORTCONTRs for receiving signals INIT0 317, . . . INITZ 327, respectively. The output INITA 366 of INIT_AND 365 is connected to each PORTCONTR.

Figure 7:
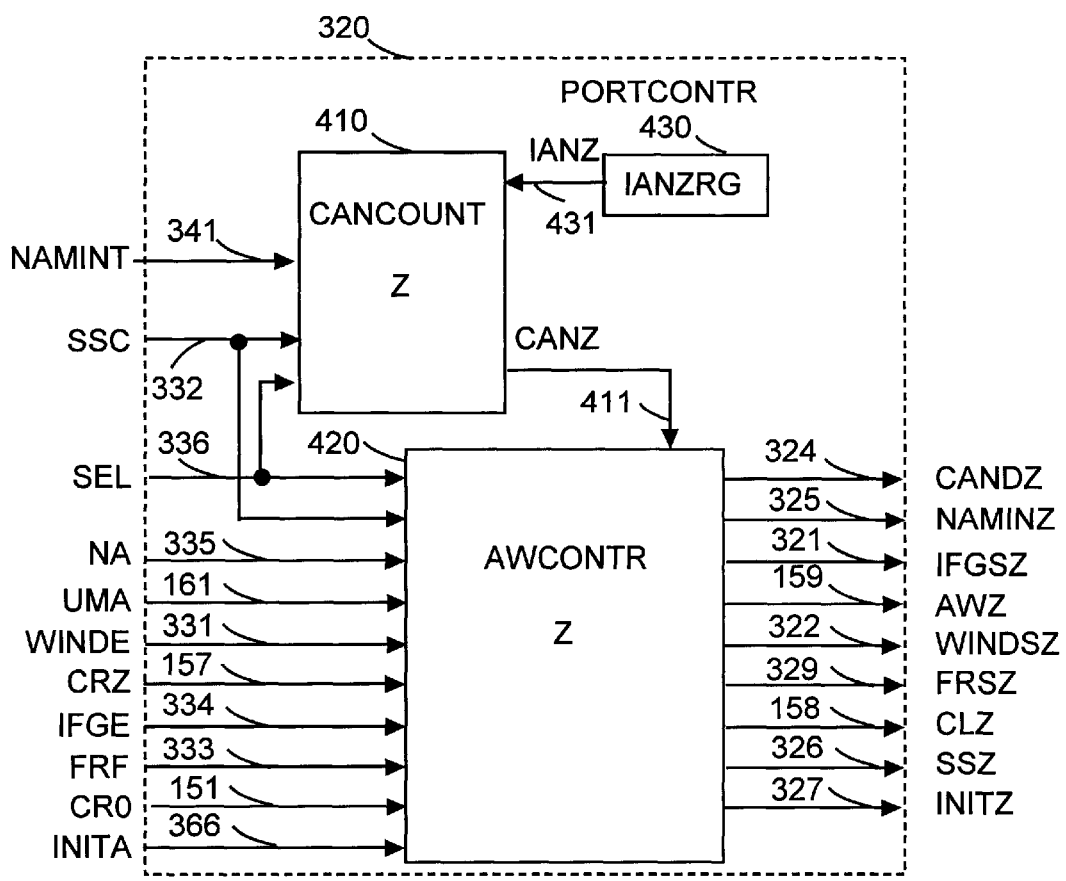
FIG. 7 shows a block diagram of a preferred embodiment of the port controller (PORTCONTR), which is a component of the corrector, shown in FIG. 6. Each corrector has N port controllers. All port controllers 0, 1, ... Z preferably have the same structure. PORTCONTR Z is illustrated in FIG. 7.

FIG. 7 illustrates a preferred structure of the PORTCONTR for port Z 320, Z=0, 1, . . . N−1, where N is a number of port of a hub. The block PORTCONTR 320 for all ports preferably has the same structure. As can be seen in FIG. 7, PORCONTR 320 includes the element CAN- COUNT Z 410 for current access number (CAN) counting in the port Z. CANCOUNT Z 410 has the following input signal and links: NAMINT 341, SSC 332, SEL 336, and IANZ 431. The block CANCOUNT Z generates one output signal CANZ transmitting via the link 411.

PORTCONTR 320 also includes the element AWCONTR Z 420 for controlling the access window in the port Z. AWCONTR Z 420 has the following input signal and links: SSC 332, SEL 336, NA 335, UMA 161, WINDE 331, CRZ 157, IFGE 334, FRF 333, CR0 151 INITA 366, and CANZ 411. The block AWCONTR Z generates the following output signals: CANDZ 324, NAMINZ 325, IFGSZ 321, AWZ 159, WINDSZ 322, FRSZ 329, CLZ 158, SSZ 326, and INITZ 327.

PORTCONTR 320 includes element IANZRG 430, which is the initial access number (IAN) register for port Z containing the access number for port Z.

Figure 10:
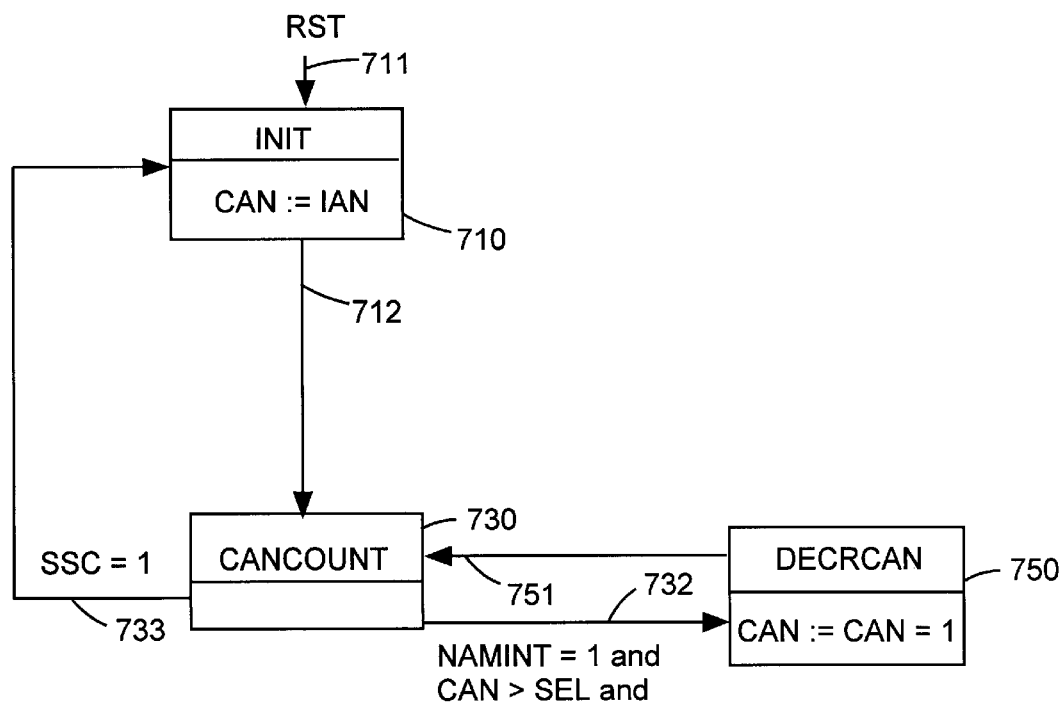
FIG. 10 presents a Finite State Machine, which describes the functionality of the Current Access Number Counter (CANCOUNT), that is a component of the port controller (PORTCONTR) of FIG. 7.

FIG. 10 is a flowchart illustrating the behavior of current access counter CANCOUNT 410, a component of PORTCONTR 320. The main function of CANCOUNT is to change the current access numbers (CANs) of the ports, when a port changes its state from active to passive (or the hub is reinitiated). When a selected port, which has CAN= SEL, becomes passive, all other active ports, which have CANs higher than SEL must decrease their CANs by one. A passive port can have any CAN. After reset (RST) or sync-signal, CANCOUNT is in state INIT 710. In this state current acess number of the port receives the value of its initial access number (CAN:=IAN), and CANCOUNT goes to state CANCOUNT. In this state, when NAMINT=1, CAN>SEL, the port goes to state DECRAN, and the current access number of this port is decreased by one.

Figure 8:
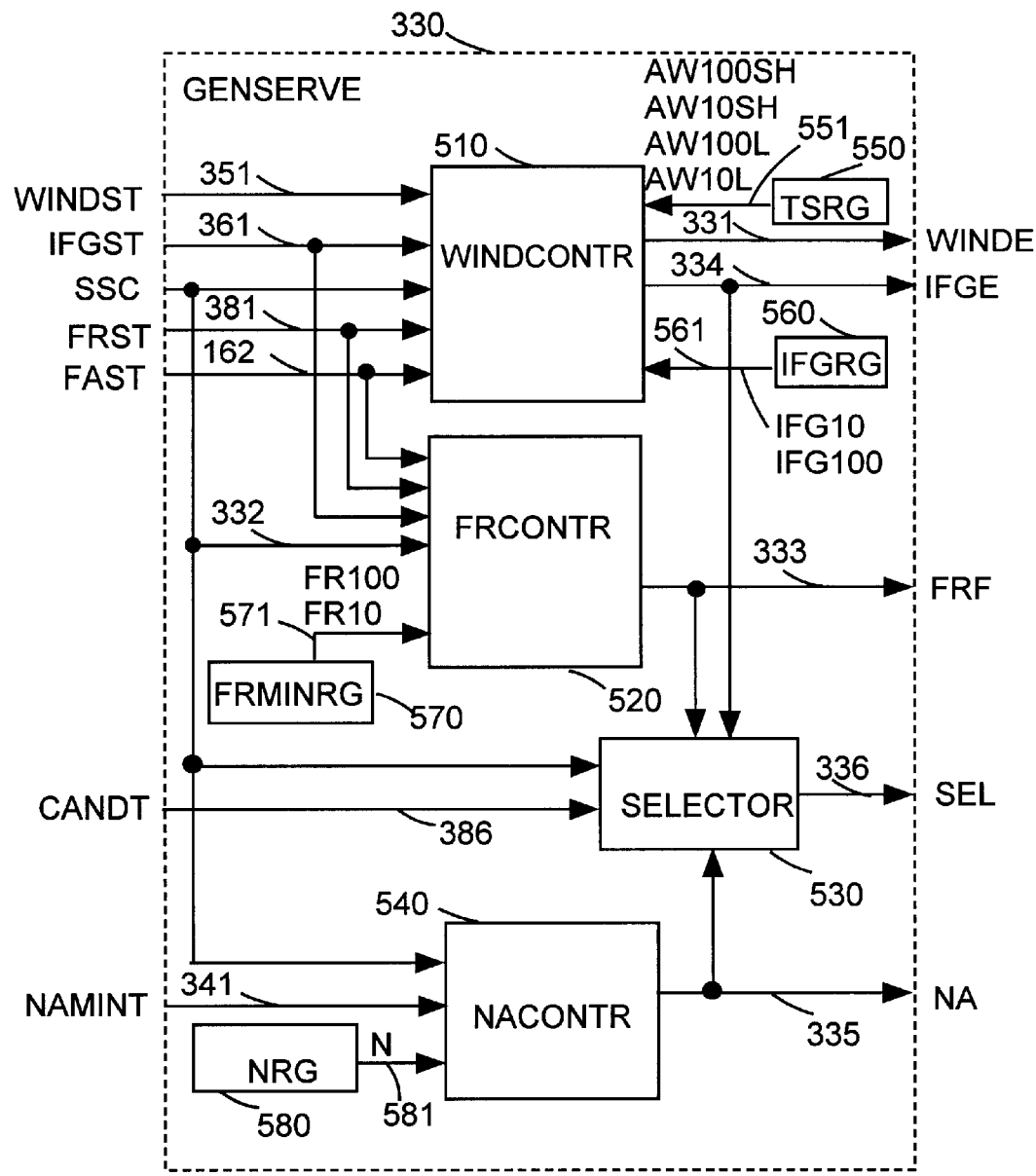
FIG. 8 shows a block diagram of a preferred embodiment of the General Server (GENSERV), which is a component of the corrector, presented on FIG. 6.
Figure 11:
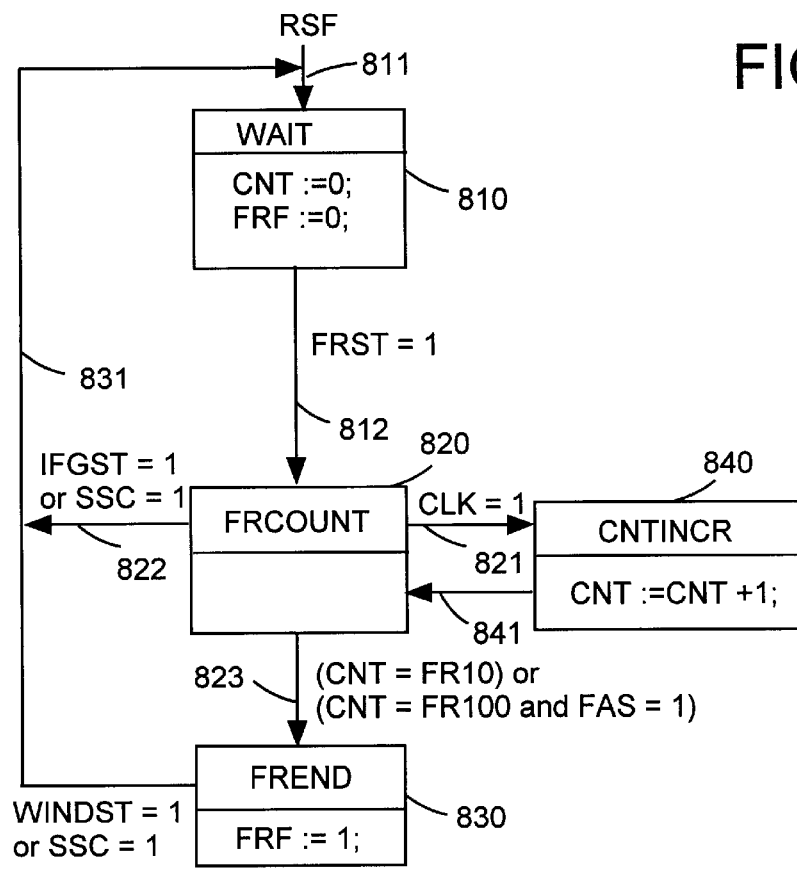
FIG. 11 presents a Finite State Machine, which describes the functionality of the Frame Controller (FRCONTR) that is a component of the General Server (GENSERV) of FIG. 8.
Figure 12:
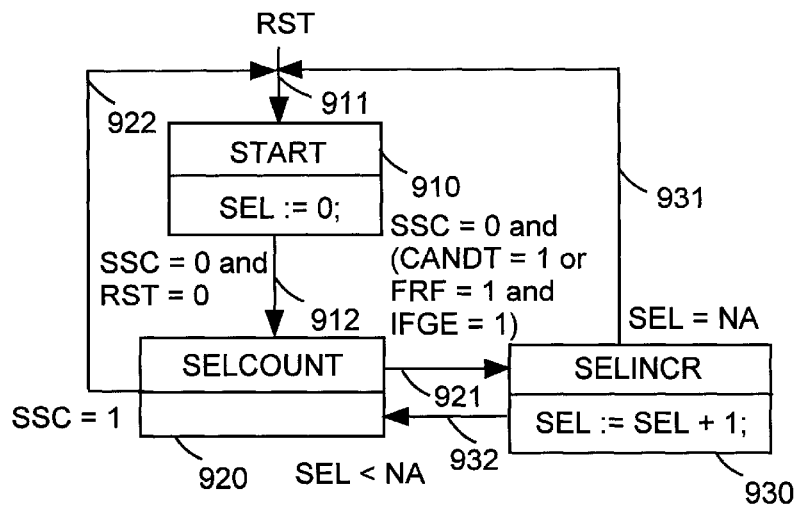
FIG. 12 presents a Finite State Machine, which describes the functionality of the Selector that is a component of the General Server (GENSERV) of FIG. 8.
Figure 13:
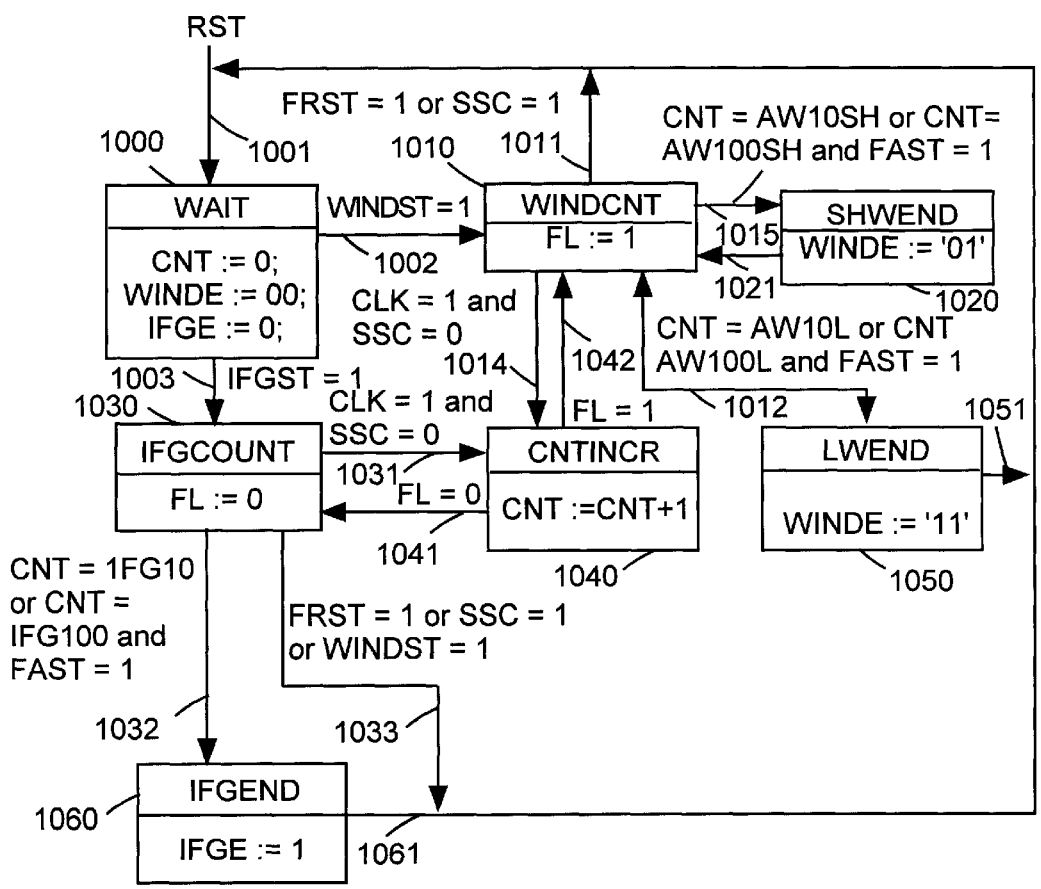
FIG. 13 presents a Finite State Machine, which describes functionality of the Window Controller (WINDCONTR) that is a component of the General Server (GENSERV) of FIG. 8.
Figure 14:
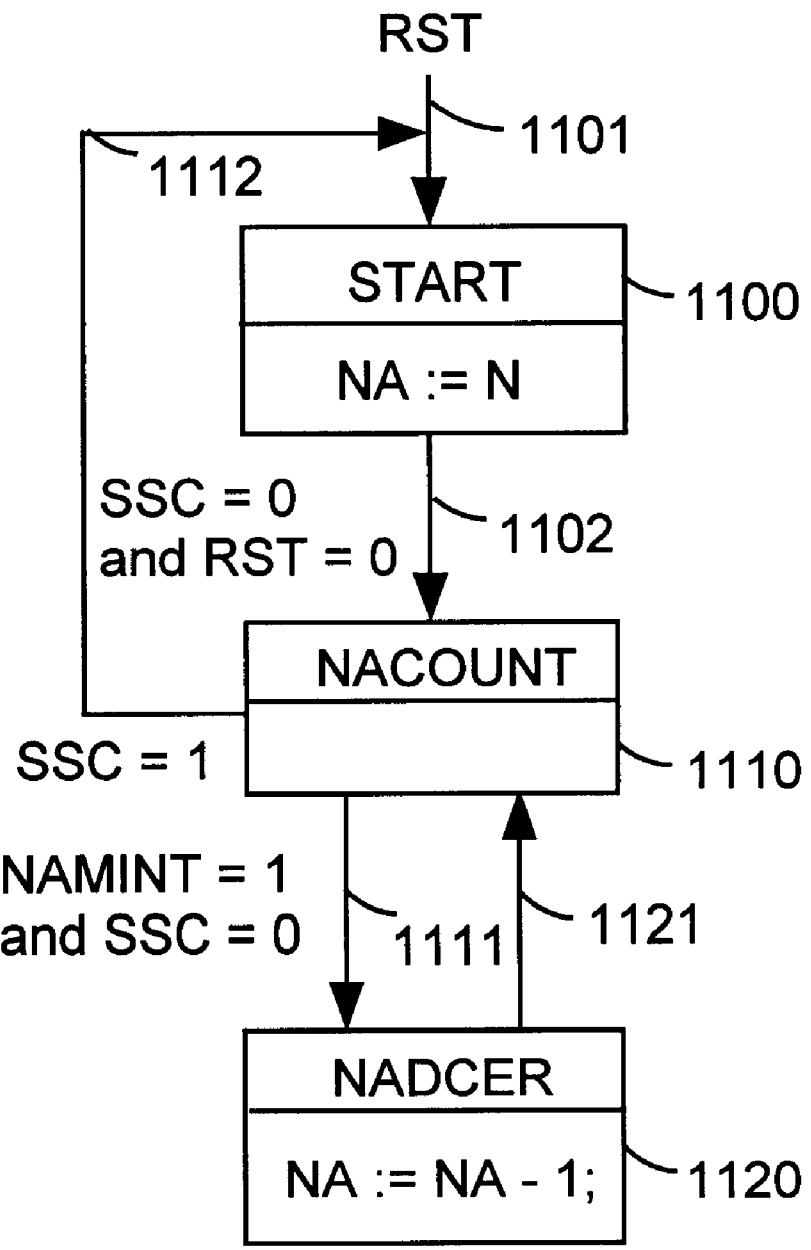
FIG. 14 presents a Finite State Machine, which describes the functionality of the Number of Active Node Controller (NACONTR) that is a component of the General Server (GENSERV) of FIG. 8.

FIG. 8 illustrates a preferred structure of GENSERV 330. GENSERVE 330 includes a window length controller WINDCONTR 510, the behavior of which is illustrated by FIG. 13. GENSERVE 330 includes a frame length controller FRCONTR 520, the behavior of which is illustrated by FIG. 11. GENSERVE 330 includes a transmitting node selector SELECTOR 530, the behavior of which is illustrated by FIG. 12. GENSERVE 330 includes a number of nodes controller NACONTR 540, the behavior of which is illustrated by FIG. 14.

GENSERVE 330 also includes a minimum frame length register FRMNRG 570, which contains data about minimum frame length (in clocks) for different speeds of transmission (FR10, FR100). GENSERVE 330 includes an inter-frame gap length registers IFGRG 560, which contains data about inter-frame gap length (in clocks) for different speeds of transmission (IFG10, IFG100). GENSERVE 330 includes a time slot length register TSRG 550, which contains data about time slot length (in clocks) for different speeds of transmission and different length of hub station links (AW100SH, AW10SH, AW100L, AW10L). GENSERVE 330 includes a number of ports register NRG 580, which contains data about the number of ports in the hub.

Figure 9:
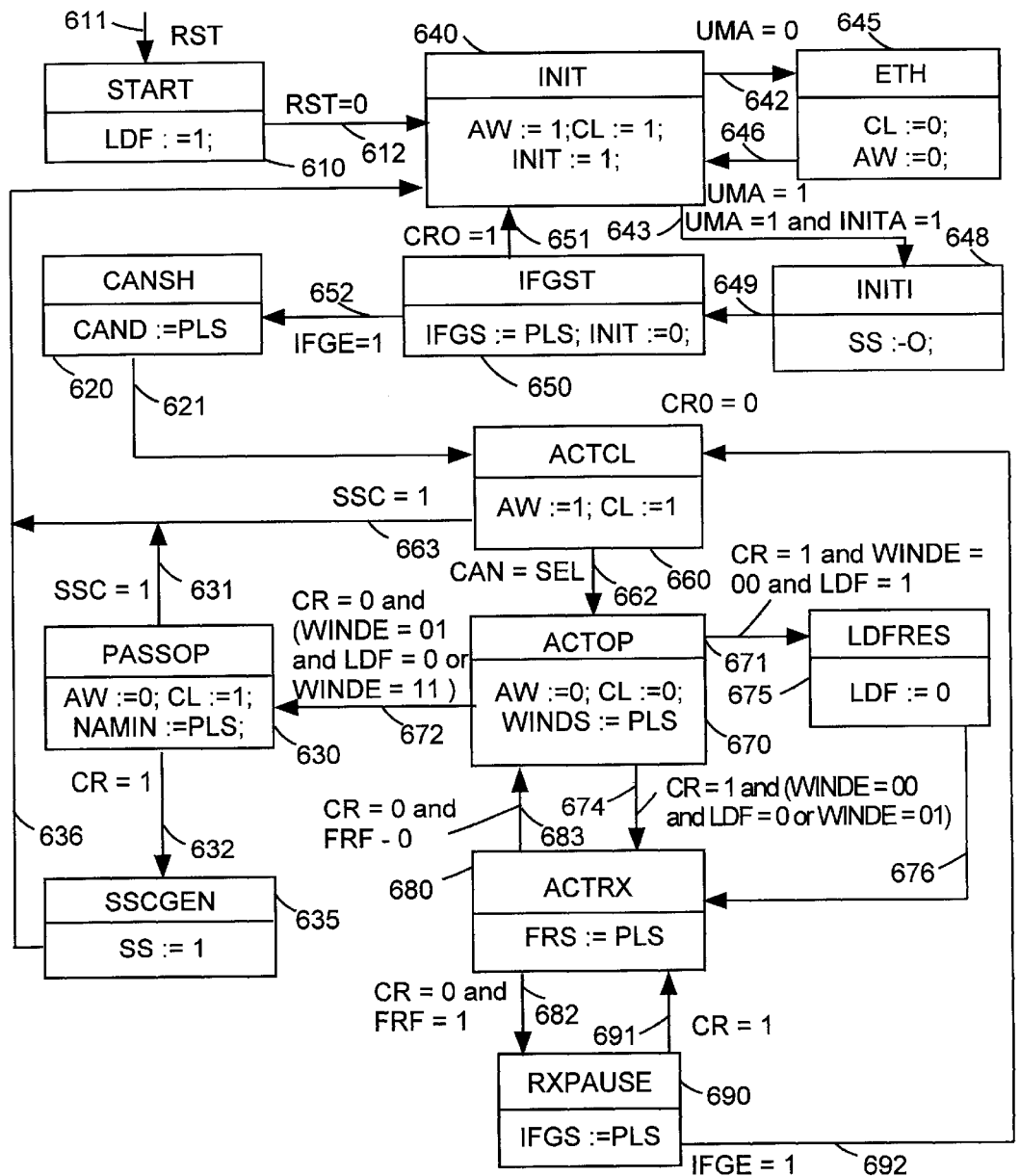
FIG. 9 shows a Finite State Machine, which describes the functionality of the Access Window Controller (AWCONTR), which is a component of the port controller (PORTCONTR) of FIG. 7.

FIG. 9: Adaptation to Variable Network Parameters

FIG. 9 is a flowchart showing the function of the Access Window Controller (AWCONTR 420), which is a component of port controller (PORTCONTROL 320 of FIG. 7). The AWCONTR 420 is the basic mechanism, which controls the behavior of an appropriate port of the hub. Each port is controlled by the associated AWCONTR 420. The method of adaptation of AWCONTR 420, illustrated in FIG. 9, includes the following mechanisms of adaptation: adaptation to network topology; adaptation to node activity and bursty traffic; and adaptation to changes in the length of the links.

Referring to FIG. 9, when a hub is switched on or initiated (by signal RST 611), AWCONTR 420 goes to state START 610. In this state the long distance flag LDF, which is used in processing the link distance adaptation, is set to 1, and after the reset signal becomes low (RST=0) AWCONTR 420 goes to the state INIT (transfer 612). In state INIT 640 AWCONTR 420 closes its access window (AW=1) and repeater input (CL=1), installs initiation flag (INIT=1), and analyses the value of the input signal UMA, which defines a selected mode of operation.

If UMA=0, AWCONTR 420 goes to state ETH 645, else (UMA=1) AWCONTR 420 will stay in state INIT 640 until INITA=1. In the state ETH 645, AWCONTR 420 opens its access window (AW=0), and repeater input (CL=0), which makes interface 120 transparent to input/output signals and provides the possibility of operation in the standard Ethernet mode (if repeater 110 supports this mode).

If UMA=1 (the hub operates in UMA mode), AWCONTR 420 waits until all ports go to the state NIT, and INITA 366 (FIG. 6) on the output of INIT_AND 365 will have active level (INITA=1). In this time, AWCONTR 420 of each port goes to state INIT1 648.

In the state INIT1 each port sets low level of synch-signal (SS=0) and waiting when input of port 0 will be idle (CR0=0).

Carrier control of input of port 0 is used for adaptation to changes in network topology. If several UMA hubs are interconnected in a network, using port 0 of each lower level hub to connect to a higher level hub, then in time of initiation only one (top level) hub has an idle carrier on the input of port 0. Consequently, ports of only one hub will go from the state INT 1 to state IFGST 650. This hub becomes active, and can open its ports to receive and retransmit packets. All other hubs are passive and they will receive and retransmit incoming packets. When an active hub opens an access window for a port and starts to receive packet from the port the hub becomes passive until the open port becomes idle. Each passive hub with its ports in state INIT 1 is waiting until higher level hub opens its port, to which this hub is connected by port 0. At this time, the hub becomes active. Each port of the hub goes to state IFGST.

To explain the mechanism of topology adaptation, let us consider some illustrative examples. Let us assume that there are three hubs in the network A, B, and C. We will assume that the hubs can be interconnected by two different topologies T1 and T2. In both topologies hub A is the top level hub, an Ethernet station is connected to its port 0.

Let us assume that in the network with topology T1, port 0 of hub B is connected to port of hub A, and port 0 of hub C is connected to 2 of hub B. In the network with topology T2, connection of port 0 of hub C is changed and the port is connected to port 6 of hub A. In both cases, the UMA corrector after reset will automatically adapt to the topologies.

With topology T1 after reset all ports of hubs A, B, and C go to state INIT 1, but only the ports of hub A move to state IFGST because port 0 of hub A is idle. Hub A becomes active and starts opening its access windows starting from port 1. When port 5 is open, hub B has idle signal on input of port 0, and all its ports moves from state INIT 1 to state IFGST. Hub B becomes active and hub A is passive until its port 5 becomes idle. When hub B opens its port 2, all ports of hub C move to state IFGST, and port C becomes active and sequentially opens its ports starting from port 1. When hub C opens port 0, hub B becomes active until it opens its port 0. After that hub A becomes active and so on.

With topology T2 hub A is active until it opens port 5, then hub B is active until it opens port 0. After that port A becomes active again and opens port 6. Hub C, connected to port 6 of hub A, becomes active and so on.

Therefore, with each topology at any given time, only one hub is active, and all other hubs retransmit incoming packets.

Now, we continue consideration of behavior of ports when they are in state IFGST. In this state each node generates a short pulse IFGS to start inter-frame gap counter (IFGS=PLS), discarding the INIT flag (INIT=0), and if CR0 is not active, waits for inter-frame gap end signal (IFGE=1), which will be sent by WINDCONTR 510 when gap time is expired. If CR0 is equal to 1 before IFGE=1, AWCONTR 420 returns to the state INIT.

In state CANSH 620, AWCONTR 420 generates the pulse CAND, which is using to start opening access windows from port 1, not port 0. After that each port goes to state ACTCL 660 and closed access window (AW=1) and repeater input (CL=1).

In state ACTCL 660, each node waits its turn to open an access window. Each node has a current access number CAN, and it opens its access window when the selector signal (SEL), generated by SELECTOR 530, becomes equal to this node CAN (CAN=SEL). In this case, the selected port goes to state ACTOP 670.

If in state ACTCL 660 the sync-signal appears, each port goes to state INIT 640.

In state ACTOP 670 the selected port (a single port in the network) opens its access window (AW=0) and input to the repeater (CL=0), and generates pulse (WINDS=0) to start window duration counter in the module WINDCONTR 510. In this state, AWCONTR 420 adapts to the link length between the hub and the station connected to this port, with a given speed of transmission in the media.

The mechanism of length adaptation works as follows. Let us assume that a possible distance can be selected from a set of possible distances. In our simple case, the set includes two distances: short and long. After the pulse WINDS is generated, and short-distance window duration is expired (for any given speed of transmission), the module WINDCONTR 510 generates wind-end signal WINDE equal to 01; after the long-distance window duration is expired the signal WINDE is equal to 11.

Before adaptation to a distance (LDF=1), AWCONTR 420 is adjusted to the longest distance, and opens its access windows for each port for the longest duration but if before the longest duration is expired (WINDE=11), a carrier signal is detected in such time, which indicats that the real distance is in the short region, then the ports adapt to the short length channel.

If LDF=1 and carrier appears while WINDE=00 (in short-link region), the AWCONTR goes to state LDFRES 675, and resets the long-distance flag to 0 (LDF=0), what indicates that this port has a short-distance link. After that, AWCONTR 420 goes to the state ACTRX 680.

If LDF=1, and carrier appears after short-distance duration is expired (WINDE=1) AWCONTR 420 goes to state ACTRX, have long-distance flag set (LDF =1), which indicates that this port has a long-distance link.

If LDF=1 and carrier appears after the short-distance duration is expired (WINDE=01) AWCONTR 420 goes to state ACTRX 680.

In the case when the carrier is idle until short-distance duration is expired (WINDE=01) with LDF=0, or long-distance duration is expired (WINDE=11) AWCONTR 420 goes to state PAS SOP 630, what indicates that the station connected to the port has no packets and the port becomes passive.

In state ACTRX 680, AWCONTR 420 generates start-of-frame pulse (FRS=PLS) to start length-of-frame counter, and is receiving incoming packet, or sequence of packets separated by a short gap (shorter than the standard inter-frame gap). The sequence of packets may come from another UMA hub, connected to the port.

The pulse FRS starts frame length counter in module FRCONT 520. when a minimum frame length is counted FRCOUNT sets frame-length flag (FRF=1), before that FRF is low.

While in state ACTRX, AWCONTR 420 monitors carrier and FRF. If carrier becomes idle (CR=0) and FRF=0, AWCONTR 420 goes back to state ACTOP. If carrier becomes idle after FRF=1, AWCONTR 420 moves to the state RXPAUSE 690.

In the state RXPASE 690, AWCONTR 420 generates the pulse IFGS, to start the inter-frame gap counter, and is waiting for IFGE=1. If the carrier becomes active (CR=1) before IFGE=1 (the gap is shorter than an expected inter-frame gap), AWCONTR goes back to state ACTRX 680 to receive the next packet. If the inter-packet gap duration is expired (IFGE=1), AWCONTR 420 goes to the state ACTCL 660.

When AWCONTR of a port goes to the state PASSOP, this means that the port becomes passive. In this state AWCONTR 420 opens the access window (AW:=0), closes the repeater input (CL:=1), and generates signal NAMIN to indicate that the number of active ports has been decreased by one. This state of AWCONTR 420 continues until the station connected to the port becomes active (CR=1) or the hub is reinitiated by sync-signal (SSC=1).

When a passive port becomes active (CR=1 in state PASSOP) different procedures can be used. For example, number of active ports can be increased by one, and CAN of the activated port can receive the value of NA−1, where NA is the number of active ports after the increasing.

In the example, illustrated on FIG. 9, the most robust case is used when changing the passive state of a port to the active state is used to reinitiate the hub, and to corect all faults, which may exist at this time in the hub. So, when a passive port becomes active (CR=1) AWCONTR 420 goes from state PAS SOP to state SSGEN, generates sync-signal (SS:= 1), and goes to state INIT.

FIGS. 15–28: Detailed Discussion of Preferred AUMA Algorithm, Calculations of Performance of AUMA Method, and Alternate Embodiments The inventive AUMA technique provides substantial performance advantages over conventional protocol and access techniques. A preferred AUMA algorithm to practice the AUMA method, a discussion of the theory of AUMA operation, and calculations of the performance advantages of the AUMA apparatus and method is provided in this section.

The AUMA method provides a means for adaptation to changing network parameters. Those mechanisms of adaptation provide in varying environment increasing network capacity utilization and decreasing latency. In most LANs and wireless networks, the AUMA technique provides theoretically maximum capacity utilization and minimum latency.

1. Media Access Control

Each node operates in AUMA mode (Adaptive Universal Multiple Access mode, which is an improvement of the Universal Multiple Access (UMA) technique disclosed by the inventor of the present application in U.S. Pat. No. 5,576,702 entitled "Method and apparatus for fault tolerant transmission in multi-channel networks."

The AUMA algorithm of the present invention preferably uses the following parameters, known at each node:

TS—Network Time Slot

N—Maximum Number of Nodes in the network

IAN—Unique Initial Access Numbers of the nodes, selected from the range of 0, 1, N−1

Current information, used on MAC layer, includes:

CRS—Carrier Sense Signal

COL—Collision Detection Signal 1.1.1. AUMA MAC Procedure

1. If there exist an active node, having CAN 0, this node, when the media becomes idle, transmits a packet and assigns CAN:=CN−1.
2. Each active node, having CAN>0, when the media becomes idle starts Time Slot Timer (TTS) for duration of the Time Slot (TS). The timer switched off when the media becomes busy.
3. If in an active node, which has CAN>0, TTS expired the node assigns CAN:=CAN−1, CAN:=CN−1, and the procedure goes to step 1.
4. If an active node, which has CAN>0, detects a packet on the media it assign CAN;=CAN−1 and the procedure goes to step 1.
5. If an active nodes detects a collision on the media, it assigns CAN:=IAN, CN:=N, and the procedure goes to step 1.

UMA optimally is defined by the following theorem and corollary:

2. AUMA Properties 2.1 Theorem.

In ordinary networks with star or bus topology AUMA provides the following properties:

1. Real-time transmission under arbitrary traffic
2. Ethernet compatibility
3. Minimum latency under low traffic
4. Maximum utilization under heavy traffic
5. Sub-optimal utilization under bursty traffic.

2.2 Corollary

Under heavy traffic AUMA is optimal, and for bursty traffic—sub-optimal, for a range of cabled and wireless networks, including:

1. 10 Mbps Ethernet: IEEE 802.3 10BASE-T, 10BASE-5, 10BASE-2, 10BROAD-36; 10BASE-FP
2. 100 Mbps Fast Ethernet: IEEE 802.3 100BASE-T4, 10BASE-TX
3. Wireless LANs: IEEE 802.11
4. Multiple-access intrachip bus for communication between chip modules, if the length of the bus is less than 10 cm, the transmission rate is 1 GHz or less.
5. Multiple-access computer bus, if the length of the bus is less than 0.5 m, the bus rate is up to 200 MHz or less.
6. Multiple access channel of cellular networks if the length of the channel is less than 50 km, the channel speed is up to 1 Mbps or less, and the minimum packet length is 512 bits.

2.3. Theory vs. Simulation

UMA technology was simulated in Russia at Research Center of Computer Communications and Council of Cybernetics, Russian Academy of Sciences (Moscow), and in USA at Advanced Micro Devices (Sunnyvale, Calif.). In the both cases very close results were received. Theoretical estimates were based on the results described later, with parameters which were used in UMA simulation at AMD.

The comparison of theoretical and simulation results show that theoretical and simulation have a very good coincidence: both utilization and latency, for a Fast Ethernet networks (100 Mbps), both with the shortest (64 bytes), and the longest (1500 bytes) packets differ in all points of less than 1.5%.

2.4. Definitions

The Theorem is used the following definitions:

AUMA networks—Multiple access networks, in which each node uses AUMA MAC procedure.

TS—Time Slot duration: a MAC parameter.

TM—Maximum end-to-end network propagation delay: network parameter.

Real-Time Transmission—Transmission with a limited latency, when a maximum delay between a packet arrival on MAC level and successful transmissions of the packet is limited to a predefined duration.

Arbitrary Traffic—Random (uniform or bursty) traffic with arbitrary level of network load.

Ethernet Compatibility—Compatibility with the standard Ethernet, which allows to use, without interface devices or software, standard Ethernet cabling, hubs, network operation systems, applications etc. Ethernet-compatible nodes can be used in mixed networks, in which some nodes are standard Ethernet nodes, and the other Ethernet-compatible nodes.

Low Traffic—Low density traffic with negligible probability of collisions.

Heavy Traffic—High density traffic, when during an arbitrary long period of time all nodes have the persistent load (permanent requirement for packets transmission), or some part of nodes have persistent load while the other nodes have, no packets for transmission.

Bursty Traffic—Arbitrary density traffic, when during some period of time (burst duration) some nodes have persistent load while the other nodes have no packets for transmission.

Ordinary Network—A group of nodes connected to a shared media with the following properties:

C1. Minimum packet transmission time is longer than the media maximum round-trip propagation delay: TPMIN>2*TM, where
TPMIN—frame duration for the shortest packet;
TM—maximum propagation delay.

C2. Packets, transmitted by any node, are being received by each other node with propagation delay no longer than TM.

C3. Nodes of the network are connected to the media at arbitrary points. The nodes can be mobile. Inter-node distances are undefined.

C4. Minimum and maximum lengths of packets are limited.

C5. Nodes do not transfer information about their current load.

Sub-Optimal Utilization—A capability of high media capacity utilization under specified conditions, fixed for some period of time, if the utilization goes to maximum with the duration of the period. Example: during some period of time some nodes have persistent load, and the other nodes have no load. After random period of time the sets of loaded and non-loaded nodes are changed.

2.5. Proof of the Theorem.

The Theorem will be proved step by step in accordance with paragraphs, of the Theorem.

2.5.1. Proof of Real-Time Transmission under Arbitrary Traffic

To prove this paragraph it is necessary and enough to prove that if all active nodes operate in AUMA mode the transmissions are collision free and that appearance of new active nodes generates limited sequence of collisions.

Indeed, if the above sentence is correct, and the number of new active nodes is limited, each active will successfully transmit its packets with a limited latency.

So, to prove this part of the Theorem it is necessary to prove:

1. If all active nodes operate in AUMA mode the transmissions are collision free, and
2. That appearance of new active nodes generates limited sequence of collisions.

2.5.1.1. Proof that if all Active Nodes Operate in AUMA Mode the Transmissions are Collision Free The proof of this part of the Theorem it necessary to prove that if all active nodes operate in AUMA mode in any given time there exists no more than one node which can transmit its packet when the media becomes free, that is that there exists no more than one node which have CAN=0.

Active nodes go to AUMA mode after a collision is detected. At this time each node has CAN=IAN. As IANs are unique, at this time there can not exist more than one node, which have CAN=0.

So, to prove this part of the Theorem it is necessary to show that when the nodes operate in AUMA mode they will rotate their CANs synchronously, and at any time all CANs will be unique.

Active nodes change their CANs in two cases: when a packet is transmitted on the media, and when their TTS timers are expired, that when the media is idle during the time TS.

As in an ordinary network each packet transmitted will be received by all nodes, it is obvious that all active nodes will synchronously change their CANS, when a packet is transmitted.

So, to prove this part of the Theorem we have to show, that if no node transmits packets during the time TS, each node on the network will detect an idle interval equal at least TS, and that if each node is active (has packets for transmission) no node on the network will detect an idle interval equal to TS or more.

The first part of the upper sentence is obvious: if there is no transmission on the network for period of TS, each node earlier or later will have an idle period of at least TS.

To prove that the if each node is active no node on the network will detect an idle interval equal to TS or more it is necessary to show, that if after transmission of a packet by a node X (which had CAN=0 before the transmission), the next packet will be transmitted by a node Y (which has got CAN=0 after the transmission node X) any node Z will not have between the transmissions an idle period of TS or more.

Let define the following denotations:

P(z/x/y)—idle period at node Z if node Y transmitted after node X;

TX(x/y)—time when node X will start transmission after node Y transmission;

RX(x/y)—time when node X will start receiving if node Y started transmission;

ETX(x)—time when node X will end transmitting;

ERX(x/y)—time when node X will end receiving if node Y finished transmission;

D(x/y)—propagation delay between nodes X and Y, D(x/y)=D(y/x).

x, y, z, v—CANs of nodes X, Y, Z, V.

Using this notations we have to show, that for any z, 1<z<N, $$P(z/x/y)<TS$$

P(z/x/y) can be defined as $$\begin{aligned}P(z/x/y) &= RX(z/y) - ERX(z/x) \\ &= TX(y/x) + D(z/y) - ETX(x) - D(z/x) \\ &= ETX(x) + D(y/x) + D(z/y) - ETX(x) - D(z/x) \\ &= D(y/x) + D(z/y) - D(z/x)\end{aligned}$$

The value of P(z/x/y) will be considered separately for networks with bus and star topology.

2.5.1.1.1. Bus Topology

Value of P(z/x/y) depends on node positions on the bus. The following possible positions will be considered:

2.5.1.1.1.1. Z-X-Y Position [FIG. 15]

Figure 15:
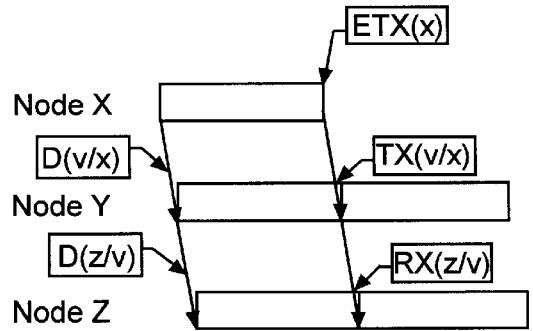
FIGS. 15–23 illustrate various aspects of the adaptation algorithm and method of the present invention at illustrative nodes of the network.

In this case, illustrated in FIG. 15, D(z/x)=D(y/x)+D(z/y), and P(z/x/y)=0.

2.5.1.1.1.2. X-Z-Y Position [FIG. 16]

Figure 16:
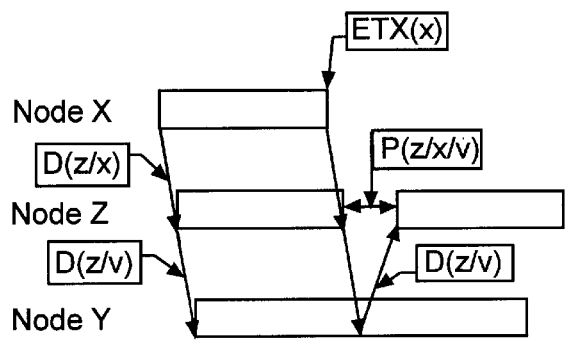

In this case, illustrated in FIG. 16, P(z/x/y)=2*D(z/y), and $P(z/x/y)_{max}=2*TM$.

2.5.1.1.1.3. X-Z-Y Position [FIG. 17]

Figure 17:
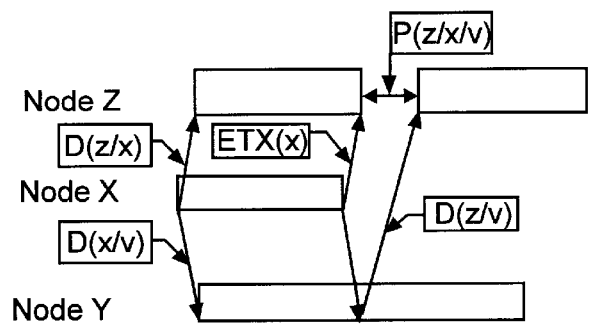

In this case, illustrated in FIG. 17, P(z/x/y)=2*D(z/y), and $P(z/x/y)_{max}=2*TM$.

2.5.1.1.1.4. Y-X-Z Position

It can be shown that this position is similar to Z-X-Y Position, and $P(z/x/y)_{max}=2*TM$.

2.5.1.1.1.5. Y-Z-X Position

It can be shown that this position is similar to X-Z-Y Position, and $P(z/x/y)_{max}=2*TM$.

2.5.1.1.1.6. Y-X-Z Position

It can be shown that this position is similar to X-Y-Z Position, and $P(z/x/y)_{max}=0$.

2.5.1.1.1.7. Conclusion for Bus Topology

In all positions of active nodes on the bus the maximum idle period is at most 2*TM. As on the Theorem condition 2*TM<TS, all active nodes will synchronously change their CANs and CN, and the transmission will be collision free.

2.5.1.1.2. Star Topology

Figure 18:
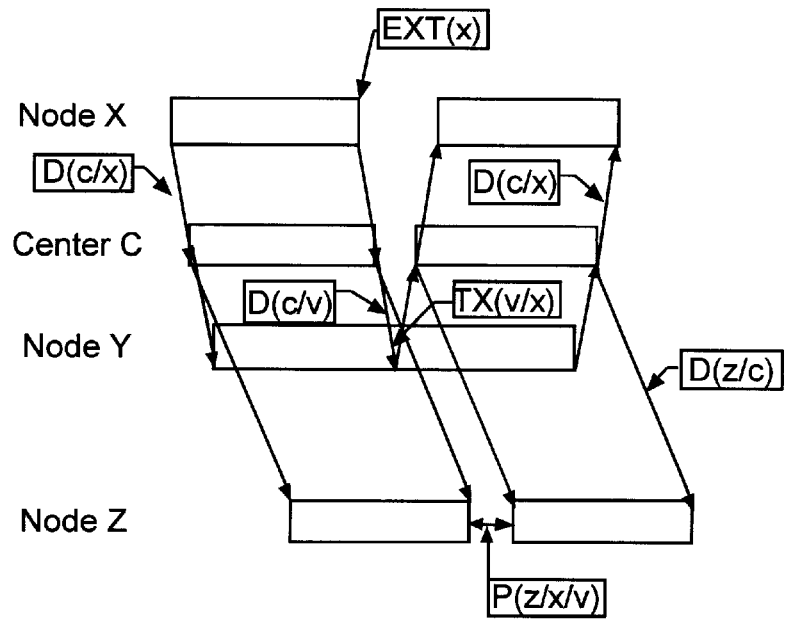

In star networks all transmissions go via central point, C. [FIG. 18]

In this case, illustrated in FIG. 18, P(z/x/y)=2*D(c/y), and as D(c/y)<=TM/2

$$P(z/x/y)_{max}=TM.$$

For transmitting node X, $$P(x/x/y)_{max}=2*D(c/y)_{max}+2*D(c/x)_{max}=2*TM$$

2.5.1.1.2.1 Conclusion for Star Topology

The maximum idle period is at most 2*TM. As on the Theorem condition 2*TM<TS, all active nodes will synchronously change their CANs and CN, and the transmission will be collision free.

2.5.1.1.3. Conclusion for AUMA Mode

As on the Theorem condition 2*TM<TS, all active nodes will synchronously change their CANs and CN, and the transmission in networks having bus or star topology will be collision free.

2.5.1.2. Proof that Appearance of New Active Nodes Generates Limited Sequence of Collisions When a new node becomes active it transmit it packets in Ethernet mode until collision. After the collision each currently active nodes has CAN=IAN, and as all IANs are unique there will be no new collisions.

Number of new nodes which can become active is limited, and as each new active node can generate only one collision the total number of collisions which can be generated at any time is limited. This proves that appearance of new active nodes generates limited sequence of collisions, and because we have proved that if all active nodes operate in AUMA mode the transmissions are collision free, this prove point 1 of the Theorem, that in ordinary AUMA networks with star or bus topology AUMA provides real-time transmission under arbitrary traffic.

2.5.2. Proof of Ethernet Compatibility

Each AUMA node can operate in standard Ethernet mode, and in this mode it completely compatible with Ethernet.

When operates in AUMA mode each node uses the same Ethernet frames and signals. In this mode a node can transmit a packet only the media is idle, and IFG expired, that is in the time at which a standard Ethernet node can transmit its packet. So, AUMA node does not violate standard Ethernet rules of transmission.

In some situations, when a standard Ethernet node can transmit its packet, AUMA node will not transmit, as it detects a possibility of collision, which is undetectable for a standard Ethernet node.

But this lack of transmission is the same as absence of a packet in the node, and in any case it can violate the standard Ethernet protocol.

It is obvious that AUMA node can operate with the standard Ethernet cabling, hubs, NOSs and applications, as MAC procedure is indifferent to those components. This proves compatibility of AUMA nodes with standard Ethernet nodes.

2.5.3. Proof of Minimum Latency under Low Traffic

Under low traffic AUMA node operates in Ethernet mode and transmits packets immediately after the media becomes idle. As in the ordinary networks there is no possibility to transmit earlier, AUMA provides minimum latency under low traffic.

2.5.4. Proof of Maximum Utilization under Heavy Traffic

To proof this part of the Theorem it will be shown that under persistent traffic, when all nodes have packets for transmission AUMA will provide maximum capacity utilization.

In this case all nodes will operate in AUMA mode.

According to AUMA protocol all N nodes at any given time have unique Current Access Numbers (CANS) 0, 1, 2 . . . N-1. After each transmission the CANs are rotated, what provides the fair access for all nodes.

Figure 19:
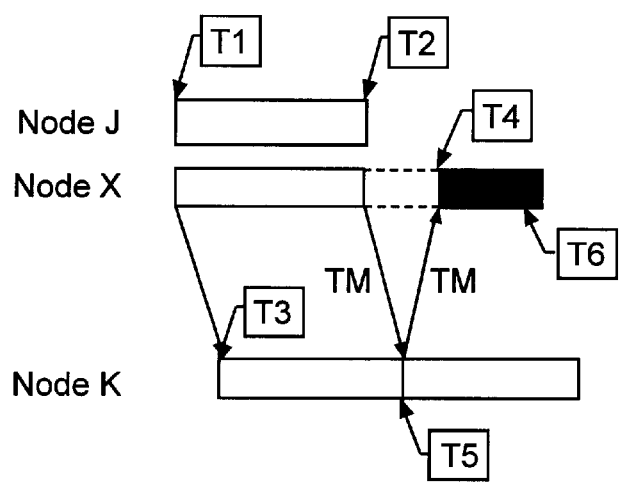

In any given time after transmission of a node J there exist a node K which has CAN=0. This node will start transmission immediately when the media in the point of this node connection becomes idle. (Time T5, as shown in FIG. 19).

To prove optimality of AUMA it is necessary to show, that there is no possibility to transmit in the network any additional packet.

Indeed, let assume that there exist an ideal node X that receives immediate information about transmission at any point of the media. Let assume that this node starts transmission of its packet immediately in the time when the node J finished its transmission. This means, that the node X can start transmission no earlier than at time T2 and can not finish it earlier (with the shortest possible packet) than at time $T6=T2+TPMIN.$ In the best case, a node K, which has CAN=0, may have a maximum distance from the node J, equal to TM, and it will start transmission no later than at time $T5=T2+TM.$ The packet will arrive to X in the best case no later than at time $T4=T2+2*TM.$ We have to show that in a ordinary network node X can not transmit its packet without collision.

Really, as in ordinary networks 2*TM<TPMIN, T4 is less than T6, and the packets from nodes X and K will be collided.

Now we will show that under persistent traffic the latency is limited.

Indeed, as all CANs are rotated after each packet, any given node will have CAN=0 periodically after N-1 packets transmitted by the other nodes. So, the maximum latency is limited by (N-1)*TPMAX, where TPMAX is frame duration of the maximum length packet. As N and TPMAX for any given network are known and limited, the maximum latency is limited.

This proves that under heavy traffic AUMA provides maximum capacity utilization.

2.5.5. Proof of Maximum Utilization under Heavy Traffic

To proof this part of the Theorem it will be shown that under persistent traffic, when all nodes have packets for transmission AUMA will provide maximum capacity utilization.

In this case all nodes will operate in AUMA mode.

According to AUMA protocol all N nodes at any given time have unique Current Access Numbers (CANS) 0, 1, 2 . . . N-1. After each transmission the CANs are rotated, what provides the fair access for all nodes.

Figure 20:
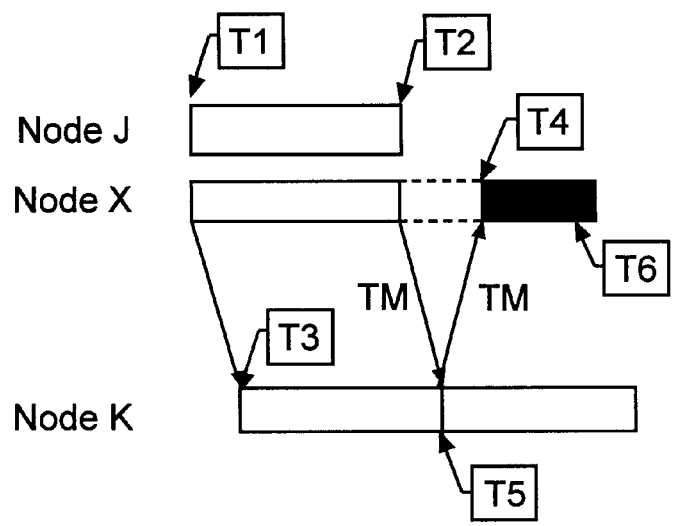

In any given time after transmission of a node J there exist a node K which has CAN=0. This node will start transmission immediately when the media in the point of this node connection becomes Idle. (Time T5, as shown in FIG. 20)

To prove optimality of AUMA it is necessary to show, that there is no possibility to transmit in the network any additional packet.

Indeed, let assume that there exist an ideal node X that receives immediate information about transmission at any point of the media. Let assume that this node starts transmission of its packet immediately in the time when the node J finished its transmission. This means, that the node X can start transmission no earlier than at time T2 and can not finish it earlier (with the shortest possible packet) than at time $T6=T2+TPMIN.$ In the best case, a node K, which has CAN=0, may have a maximum distance from the node J, equal to TM, and it will start transmission no later than at time $T5=T2+TM.$ The packet will arrive to X in the best case no later than at time $T4=T2+2*TM.$ We have to show that in a ordinary network node X can not transmit its packet without collision.

Really, as in ordinary networks 2*TM<TPMIN, T4 is less than T6, and the packets from nodes X and K will be collided.

Now we will show that under persistent traffic the latency is limited.

Indeed, as all CANs are rotated after each packet, any given node will have CAN=0 periodically after N-1 packets transmitted by the other nodes. So, the maximum latency is limited by (N−1)*TPMAX, where TPMAX is frame duration of the maximum length packet. As N and TPMAX for any given network are known and limited, the maximum latency is limited.

This proves that under heavy traffic AUMA provides maximum capacity utilization.

2.5.6. Proof of Sub-Optimal Utilization under Bursty Traffic

Under bursty traffic some part of network nodes (active nodes) during some period of time (burst duration) have persistent traffic, while the other nodes (passive nodes) have zero input traffic.

During a limited period of adaptation time (TAD) in accordance with AUMA procedure the active nodes while transmitting their first packets will adapt their CANs and CN to current situation in the burst. After adaptation the active nodes will operate in the same way as under heavy traffic, and during the rest part of the burst time the capacity utilization will be maximal.

As the period TAD, when utilization may be non-maximal, for arbitrary limited number of nodes is limited, the capacity utilization will go to maximum with the length of bust.

This proves sub-optimality of AUMA procedure under bursty traffic.

2.6. Theoretical Performance Evaluation

Using the results received for the persistent traffic we can define theoretical capacity utilization and maximum latency.

2.6.1. Utilization under Persistent Traffic

Figure 21:
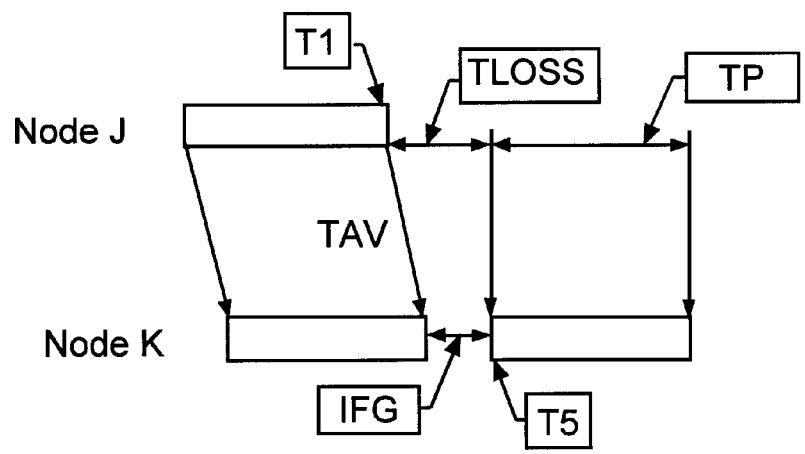

For random traffic media utilization should be defined under arbitrary high load, when all nodes have packet for transmission. Referring to FIG. 21, in this case the media utilization U is equal to $$U=TP/(TP+TLOSS)$$

Where:

TP—packet duration

TLOSS—time Interval between the end of transmission of a packet from a node J, and the next in the sequence node K; TLOSS=TAV+IFG TAV—average propagation delay between a pair of nodes in a given network;

IFG—inter-frame gap, required by a protocol.

Using those definitions it can be written:

$$U=TP/(TP+TAV+IFG) \qquad (2)$$

2.6.2. Utilization under Bursty Traffic

Under bursty traffic media utilization will be defined, using the following assumptions and denotations:

Transmission on a network consists from bursts, having random inter-burst idle periods. NA active nodes are transmitting in average during a burst. Each active node transmit during a burst NP packets, having average length of TPAV.

Figure 22:
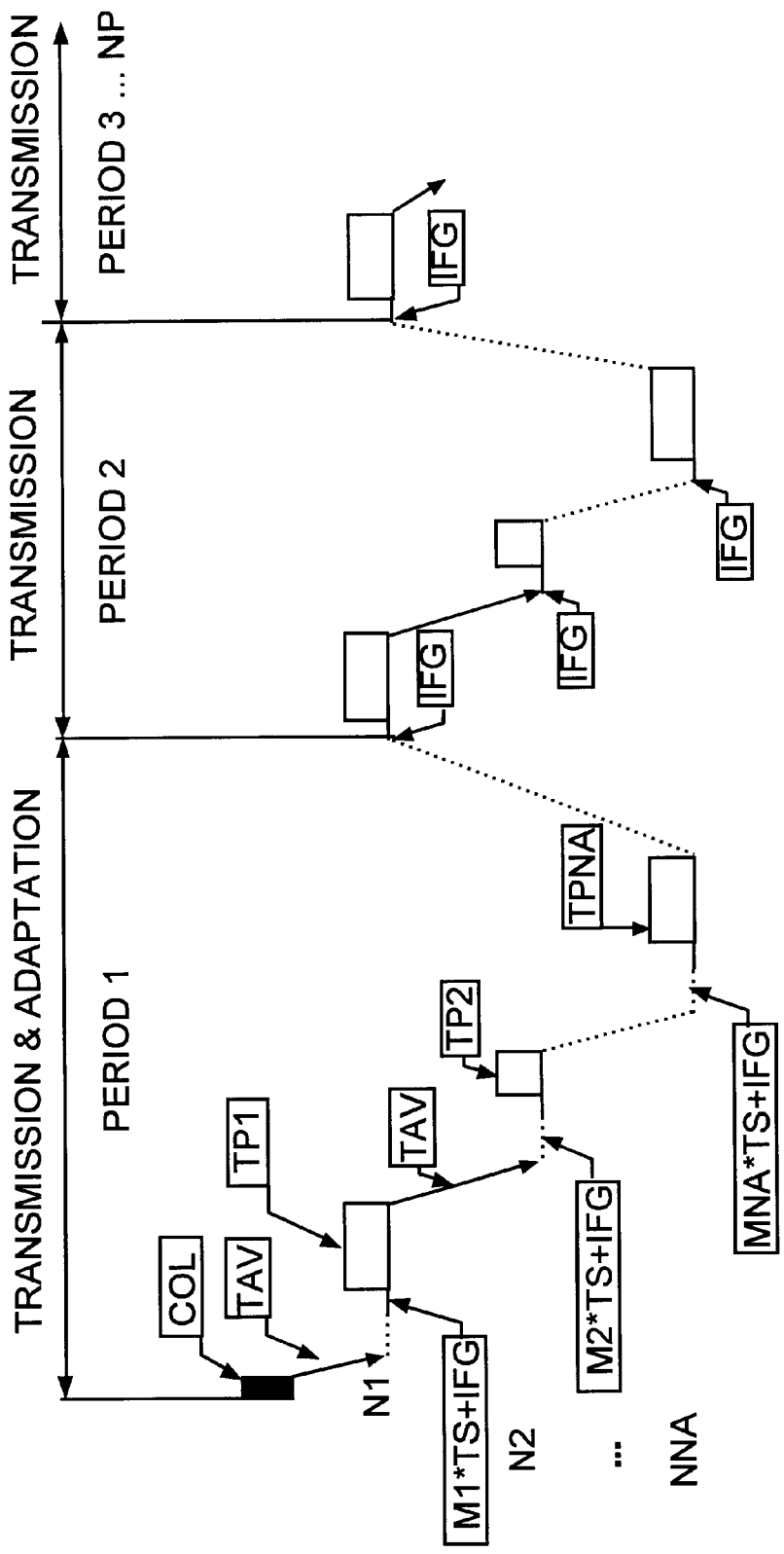

Transmitting of a bust consists from NP periods. During a period each active node transmit one packet. During the first period which is started by a single collision, active nodes adapt their CANs and CN to the current situation (Period of adaptation). During the next NP−1 periods the nodes transmit packets rotating their CANs. The situation on the network is illustrated by FIG. 22.

Where in FIG. 22:

N1, N2, . . . NNA—Initial Access Numbers of active nodes, $$0<=N1<N2< \ldots NNA<=N$$

NA—number of active nodes,

N—total number of nodes in the network (collision domain),

M—number of non-active nodes before node N1, M1=N1,

MZ—number of non-active nodes between node MZ and the preceding node, $$M1M2+ \ldots +MNA=N-NA$$

TPZ—packet duration,

TPAV—average packet duration

TAV—average propagation delay between a pair of nodes in a given network;

IFG—inter-frame gap, required by a protocol.

Using those definitions it can be written:

$$U=TPAV*NP*NA/\{TPAV*NP*NA+TS+[(M1*TS+IFG'+TAV)+ (M2*TS+IFG+TAV)+ \ldots +(.MNA*TS+IFG+TAV)]+[(NP-1)*NA*(IFG+TAV)]\}=$$

$$=TPAV*NP*NA/\{TPAV*NP*NA+TS+[(N-NA)*TS+NA*(IFG+TAV)]+[(NP-1)*NA*(IFG+TAV)]\}=TPAV*NP*NA/ \{TPAV*NP*NA+(N-NA+1)*TS+NP*NA*(IFG+TAV)\}=$$

$$=TPAV*NP*NA/\{(N-NA+1)*TS+NP*NA*(IFG+TAV+TPAV)\}$$

$$U=TPAV*NP*NA/\{(N-NA+1)*TS+NP*NA*(IFG+TAV+TPAV)\} \qquad (3)$$

2.6.3. Latency under Persistent Traffic

Figure 23:
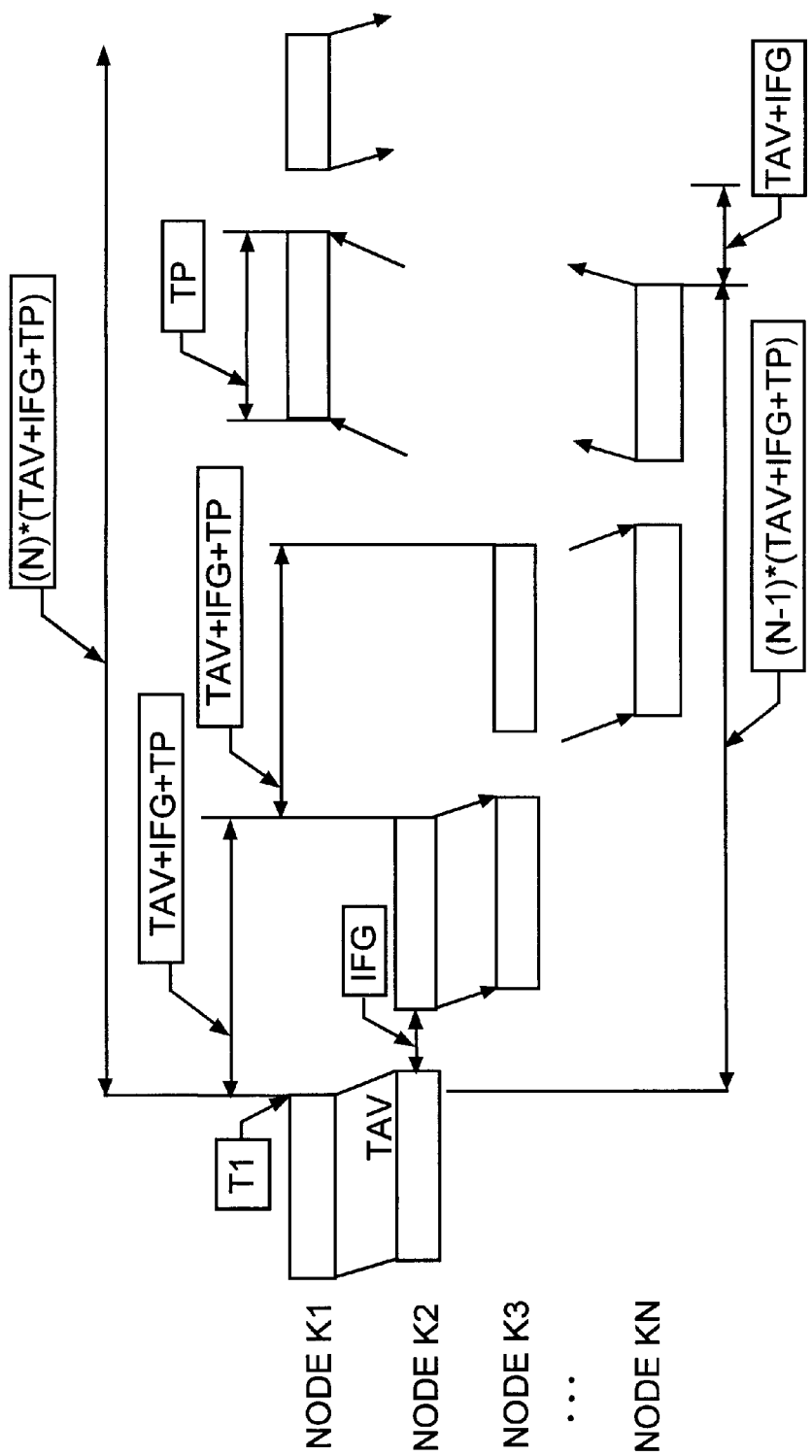
Figure 24:
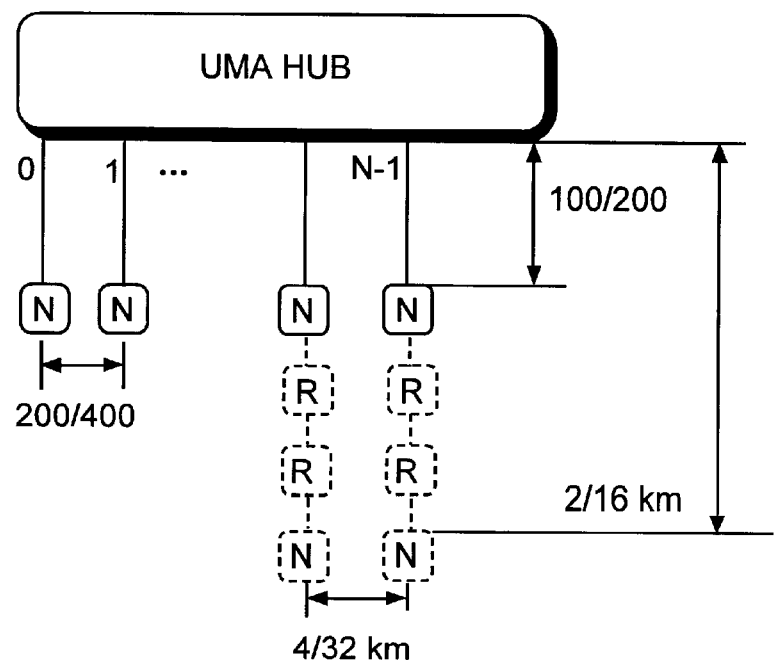
FIGS. 24–26 show illustrative hub configurations.

From the previous description it can be shown that in the case of persistent traffic the delay between successive transmission of packets from a given node (LAT) in a network with persistent traffic, having N nodes, as illustrated in FIG. 23, is:

$$LAT=N*(TAV+IFG+TP) \qquad (4)$$

2.6.4. Latency under Bursty Traffic

Latency for the worst case of bursty traffic is defined as the duration of period of adaptation, as illustrated in FIG. 22, starting from collision and finishing in the end of packet transmission by the last node NNA, having the highest IAN=N−1.

$$LAT=TS+NA-TPAV+[(M1*TS+IFG+TAV)+(M2*TS+IFG+TAV)+ \ldots +(MNA*TS+IFG+TAV)]=NA*(TPAV+IFG+TAV)+(N-NA+1)*TS$$

$$LAT=NA*(TPAV+IFG+TAV)+(N-NA+1)*TS \qquad (5)$$

2.6.5. Example 1. Heavy Traffic.

In the following Table we present comparative data for theoretical and simulation performance evaluation of UMA.

The data represented in the Table show that theoretical and simulation have a very good coincidence: both utilization and latency, for the shortest and the longest packets differ of less than 1.5%.

| UMA Performance Evaluation | | |
|---|---|---|
| | Fast Ethernet | |
| | 64 bytes | 1500 bytes |
| TP - Packet duration (mks) | 7.36 | 122.24 |
| TAV - Average inter-node propagation (mks) | 1 | 1 |

UMA Performance Evaluation

|  | Fast Ethernet | |
| --- | --- | --- |
|  | 64 bytes | 1500 bytes |
| IFG - Inter-frame gap duration (mks) | 0.96 | 0.96 |
| N - Number of nodes | 15 | 15 |
| Utilization | | |
| Theory: U = TP/(TP + TAV + IFG) | 0.7897 | 0.984219 |
| Simulation AMD | 0.786 | 0.984 |
| Disprecpancy: (Sim. - Theory)/Theory* 100% | −0.46848 | −0.02225 |
| Latency | | |
| Theory: LAT = N*(TAV + IFG + TP) | 139.8 | 1863 |
| Simulation AMD | 137.8 | 186.05 |
| Discrepancy: (Sim. - Theory)/Theory* 100% | −1.45138 | −0.13437 |
| Preamble (bytes) | 7 | 7 |
| Header (bytes) | 21 | 21 |
| Data Field (bytes) | 64 | 1500 |
| Frame Length (bytes) | 92 | 1528 |
| Transmission Speed (Mbps) | 100 | 100 |
| Average Inter-node Distance (m) | 200 | 200 |
| Propagation Delay (mks/m) | 0.005 | 0.005 |
| Inter-frame gap (bits) | 96 | 96 |

2.6.6. Example 2. Bursty Traffic.

To estimate AUMA under bursty traffic we will use the following model of a network and traffic.

2.6.6.1. Network Model

The network (collision domain) has 50 nodes.

The network traffic is random sequence of bursts of packets. During a burst 2 pairs of nodes are communicating each other. One node in each pair transmits long packets having 1500 bytes of data, and the other responds with short packets (ACKs) of 64 bytes long. Each node during a burst transmits 2,000 packets.

The rest of parameters we will assume with the same value as in the Example 1.

2.6.6.2. Results of Estimation

Theoretical estimates for bursty traffic with the Fischer model of bursts is presented in the following Table conjointly with results for heavy random traffic without adaptation.

The main results for a typical 50-node LAN with bursty traffic from a pair of communicating nodes:

1. Capacity utilization of higher than 95%
2. Period of adaptation is shorter than 0.4 ms.
3. Burst duration with a 3-Mbyte acknowledged message is shorter than 0.3s
4. Latency during a burst is less than 0.15 ms.

Utilization Increases with the number of transmitting nodes.

|  | UMA, 100% Load | | AUMA Bursty Traffic | |
| --- | --- | --- | --- | --- |
|  | 64 bytes | 1500 bytes | 1500/64 bytes | |
| TP - Packet duration (mks) | 7.36 | 122.24 | 64.8 | 64.8 |
| TAV - Average inter-node propagation (mks) | 1 | 1 | 1 | 1 |
| IFG - Inter-frame gap duration (mks) | 0.96 | 0.96 | 0.96 | 0.96 |
| Utilization | | | | |
| Theory | 0.7897 | 0.984219 | 0.970204 | 0.96973 |
| Simulation AMD | 0.786 | 0.984 | | |
| Simulation SIS | 0.725 | 0.975 | | |
| Discr: (simAMD-Theory)/Theory* 100% | −0.46848 | −0.02225 | | |
| Latency | | | | |
| Theory | 139.8 | 1863 | 267.04 | 133.52 |
| Simulation AMD | 137.8 | 1860.5 | | |
| Discr: (simAMD-Theory)/Theory* 100% | −1.45138 | −0.13437 | | |
| Adaptation period (mks) | | | 507.68 | 384.4 |
| Burst duration(s) | | | 0.534321 | 0.267291 |
| Preamble (bytes) | 7 | 7 | 7 | 7 |
| Header (bytes) | 21 | 21 | 21 | 21 |
| Data Field (bytes) | 64 | 1500 | 782 | 782 |
| Frame Length (bytes) | 92 | 1528 | 810 | 810 |
| Transmission Speed (Mbps) | 100 | 100 | 100 | 100 |
| Average Inter-node Distance (m) | 200 | 200 | 200 | 200 |
| Propagation Delay (mks/m) | 0.005 | 0.005 | 0.005 | 0.005 |
| Inter-frame gap (bits) | 96 | 96 | 96 | 96 |
| N - Number of nodes | 15 | 15 | 50 | 50 |
| NA - Number of active nodes | | | 4 | 2 |
| TS - Time Slot (mks) | | | 5.12 | 5.12 |
| NP - Number of packets a burst/active node | | | 2000 | 2000 |

2.7. Proof of the Corollary.

To prove the Corollary it is necessary to show that the networks, listed in the Corollary, are ordinary.

We assume that all networks, listed in the corollary, satisfy the conditions C2–C4. So, to prove the corollary it is necessary to show that the listed networks satisfy the condition C1.

1. In 10 Mbps Ethernet LANs the minimum frame length is 512 bits, and the minimum frame duration, TPMIN, is 51.2 mks. The maximum network length (for 10BROAD-36) is 3.6 km, and the maximum propagation delay, TM, is equal to 3.6*5=18 mks.

As 2*TM<=36 mks and TPMIN=51.2 mks, 2*TM<TPMIN, and the networks listed in the paragraph 1 of the corollary, are ordinary.

2. In 100 Mbps Fast Ethernet LANs the minimum frame length is 512 bits, and the minimum frame duration, TPMIN, is 5.12 mks. The maximum network length is 250 m, and the maximum network propagation delay, TM, is equal to 250*5=1,250 ns.

As 2*TM=2.5 mks and TPMIN=5.12 mks, 2*TM<TPMIN, and the networks listed in the paragraph 2 of the corollary, are ordinary.

3. In wireless: IEEE 802.11 LANS, having the transmission speed of 1 or 2 Mbps the minimum frame length (with zero Frame Body) is 34*8=272 bits, and the minimum frame duration, TPMIN, is 136 mks. The network time slot is 20 mks, and the maximum propagation delay, TM, is less than 10 mks.

As 2*TM<=20 mks and TPMIN=136 mks, 2*TM<TPMIN, and the network indicated in the paragraph 3 of the corollary, are ordinary.

4. Intrachip communication between chip modules via multi-wire channels, having the parameters listed in the paragraph 4 of the corollary, the minimum frame duration, when the frame consists only from one n-bit word, transmitted on n parallel wires, (1-bit duration), TPMIN, is 1 ns, and the maximum network propagation delay, TM, is less than 0.5 ns.

As 2*TM<1 ns and TPMIN=1 ns, 2*TM<TPMIN, and the networks defined in the paragraph 4 of the corollary, are ordinary.

5. Computer bus access, having the parameters listed in the paragraph 5 of the corollary, the minimum frame duration, TPMIN, is 5 ns, and the maximum network propagation delay, TM, is less than 2.5 ns.

As 2*TM<5 ns and TPMIN=5 ns, 2*TM<TPMIN, and the networks listed in the paragraph 5 of the corollary, are ordinary.

6. Multiple access to a channel of cellular networks, having the parameters listed in the paragraph 5 of the corollary, the minimum frame duration, TPMIN, is 512 mks, and the maximum network propagation delay, TM, is 250 mks.

As 2*TM=500 mks and TPMIN=512 mks, 2*TM<TPMIN, and the networks defined in the paragraph 6 of the corollary, are ordinary.

This proves the corollary.

Adaptive UMA Hub

1. Introduction

The main goal of this section is to describe a method of implementation of UMA technology on level of multi-port wireless or cabled active repeater, LAN hub, as for example, 10BaseT or 100BaseT.

As the Ethernet technology is the dominating technology in LANs the description will be based on specific example of designing UMA hub for Ethernet application. This illustrative example can be easily modified for other areas of application.

UMA technology provides different versions of access technique, including fair access for random traffic, fair access with adaptation to a bursty traffic, node-priority access. In this work a collision-free, burst-adaptive protocol will be used. It is referred to as Adaptive UMA.

1.1. UMA Hub Parameters

UMA hub can have different parameters:

Number of Ports

It is convenient to use number of ports in a UMA hub (N) equal to a power of two, for example 8, 16, 32, 64, etc. In modern LANS, using hubs and switches, it is common to use LAN segmentation on collision domains having approximately 16 Ethernet nodes. As UMA provides collision-free access the number of nodes in a collision domain can be higher.

For this project we have to select one of the following:

N=16,

N=32,

N>32.

Media Speed

At current rime most popular Ethernet media speed (S) is 10 Mbps. The next generation of multimedia LAN will be based mostly on 100 Mbps, 1 Gbps. Gbps. UMA can be applied with any speed, providing higher than Ethernet capacity utilization and distances.

For this project we have to select one of the following:

S=10 Mbps

S=100 Mbps

S=10/100 Mbps, switching

S=10/100 Mbps with Nway autosensing devices at each port.

Media Length

In Ethernet LANs the maximum diameter of a collision domain (if do not consider limitations of transceivers, which can be avoided by repeaters or fiber optic) is limited by collisions, as their probability increases very steep with the distance. Collisions increase latency and decrease media capacity utilization.

Network diameter is very important for the smooth migration from 10Base-T to 100Base-T networks. As discussed in S. Saunders, The McGraw-Hill High-Speed LANs Handbook. McGraw-Hill, 1996:

"Net manager expecting the forthcoming 100Base-T fast Ethernet standard to provide the same coverage as its 10-Mbit/s 10Base-T cousin will be sadly disappointed. The maximum diameter of a 100Base-T network running over Category 5 unshielded twisted pair (UTP) cable is 210 meters. That compares with the 500-meter maximum size permitted with 1-Mbit/s Ethernet. This diameter dilemma comes courtesy of a simple fact: network diameter is inversely proportional to bit rate. This distance constraint will have two effects. First, it will prevent users from cascading repeaters (a common topology in 10 Mbit/s LANs. Second, in order to extend the coverage of their 100Base-T networks, user will have to install LAN switches (or bridges and routers) between repeaters—at a cost premium that may well discourage many users from implementing fast Ethernet."

UMA technology is collision free and the degradation of capacity utilization is much lower, than in Ethernet technology. The collision domain diameter in UMA LANs can be increased at least by factor ten. If UMA is implemented inside of a hub, the maximum distance can be additionally increased by approximately factor two. Besides, in UMA hub environment different distances can be used with high capacity utilization.

For, example, in 10/100 Mbps UMA LAN, most of nodes can have the standard 10Base-T Ethernet network perimeter of 500 meters, or 250 m distance (D) from the hub, and some (NL) nodes (one, two or more) can have longer distance (DL), which could be of several kilometers. This will permit to change the existing Ethernet 10 Mbps hubs by UMA 10/100 Mbps hubs, immediately increase the network throughput by factor 3 (from 30% of 10 Mbps to 90–95%) and gradually to shift to 100 Mbps. When all the nodes have 100 Mbps adapters with appropriate cabling, the network can be switched to 100 Mbps speed with 10/100 Mbps UMA hubs already in place.

For this project we have to select one of the following:

NL=1,

NL=2, or

NL>2.

If S=10 Mbps:

D=100 m (10BaseT)

D=2000 m (10BaseFL)

D>2000 m

DL=16 km (8 links 10BaseFL with repeaters) or

DL<>16km.

If S −10/100 or 100 Mbps:

D=100 m, (100BaseT)

D=400 m, (100BaseFX) or

D>400 m

DL=400 m, (100BaseFX)

DL=1600 m (4 links 10XBaseFX with repeaters), or

DL<>1600 m.

Inter-Hub Connections

UMA hubs can be interconnected each other directly or using LAN switches. The former case is the simplest and does not need hub numbering.

For this project we have to select the Interconnection Mode (IM):

IM=SW (Interconnection by LAN switches) or

IM=DIR (Direct hub-to-hub interconnection).

Goals of the Project.

The project has the following goals:

1. Test the technology in a short period of time by implementation if in a simple, inexpensive laboratory prototype.
2. Demonstrate advantages of the technology.
3. Define the most attractive for customers variant of industrial implementation.
4. Modify the laboratory prototype to the defined industrial prototype.

Parameters for the Laboratory Prototype

For the first step of the Project we will use the following parameters:

N=16

S=10 Mbps

NL=0/2 (switch-selected)

D=100/2000 m (switch-selected)

DL=2/16 km (switch-selected)

IM=SW/DIR (switch-selected).

Hub-Segment Topology

Different variants of topology, which can be tested using the laboratory prototype, are shown on Figure, which shows topology options of the Test/Demo LAN.

Different options, which can be tested using the prototype, are listed in Table 1.

| # | NL | D (m) | DL (km) | Network Topology | Network Diameter |
|---|----|----|----|----|----|
| 1 | 0 | 100 | – | 16 nodes, 100 m | 200 m |
| 2 | 0 | 2000 | – | 16 nodes, 2000 m | 4 km |
| 3 | 2 | 100 | 2 | 14 nodes, 100 m; 2 nodes, 2 km | 4 km |
| 4 | 2 | 10 | 16 | 14 nodes, 100 m; 2 nodes, 16 km | 32 km |
| 5 | 2 | 2000 | 16 | 14 nodes, 2000 m; 2 nodes, 16 km | 32 km |

2. UMA Hubs Cascading

Two types of cascading will be considered:

1. Indirect Cascading, when UMA hubs are interconnected via switches, routers, or bridges, and each collision domain is based on a single UMA hub;
2. Direct Cascading, when several UMA hubs can be interconnected to use in a single collision domain. Indirect cascading can interconnect direct cascaded UMA hubs, if needed.

2.1. Indirect Cascading

Indirect cascading of UMA hubs can be done using any port from 0 to N−1.

Figure 25:
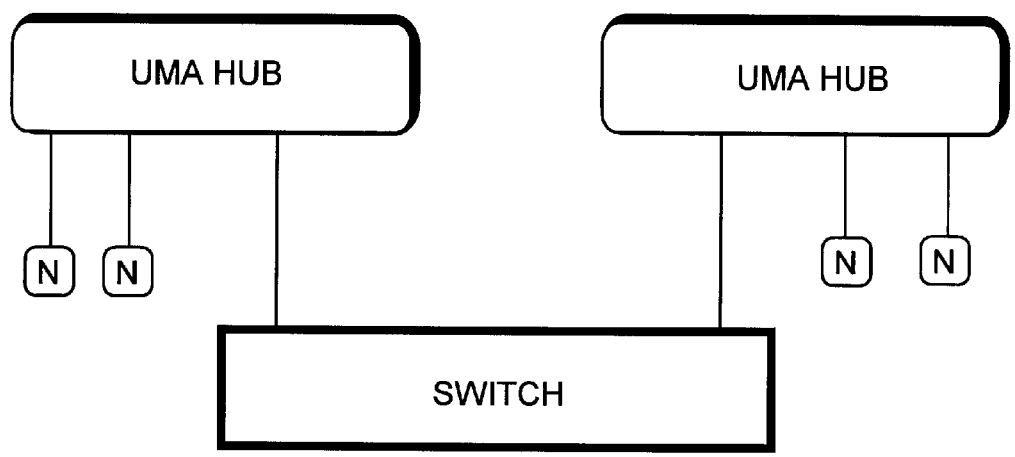

Multi-hub topology is illustrated by FIG. 25, which UMA Hubs interconnection using LAN switches.

2.2. Direct Cascading

For direct cascading of UMA hubs it is necessary io define a single hub which will operate in active mode after network initialization. This can be done by using micro-switches, or some centralized or decentralized initialization procedure.

In this paragraph some example of initialization procedure is given, which does not requires any switching or message exchange. It based on using for interconnection some predefined port number, for example port zero, which can be connected with any other non-zero port Any free port from 0 to N−1 can be connected to LAN switch. There must be no cycle connections in the network.

Figure 26:
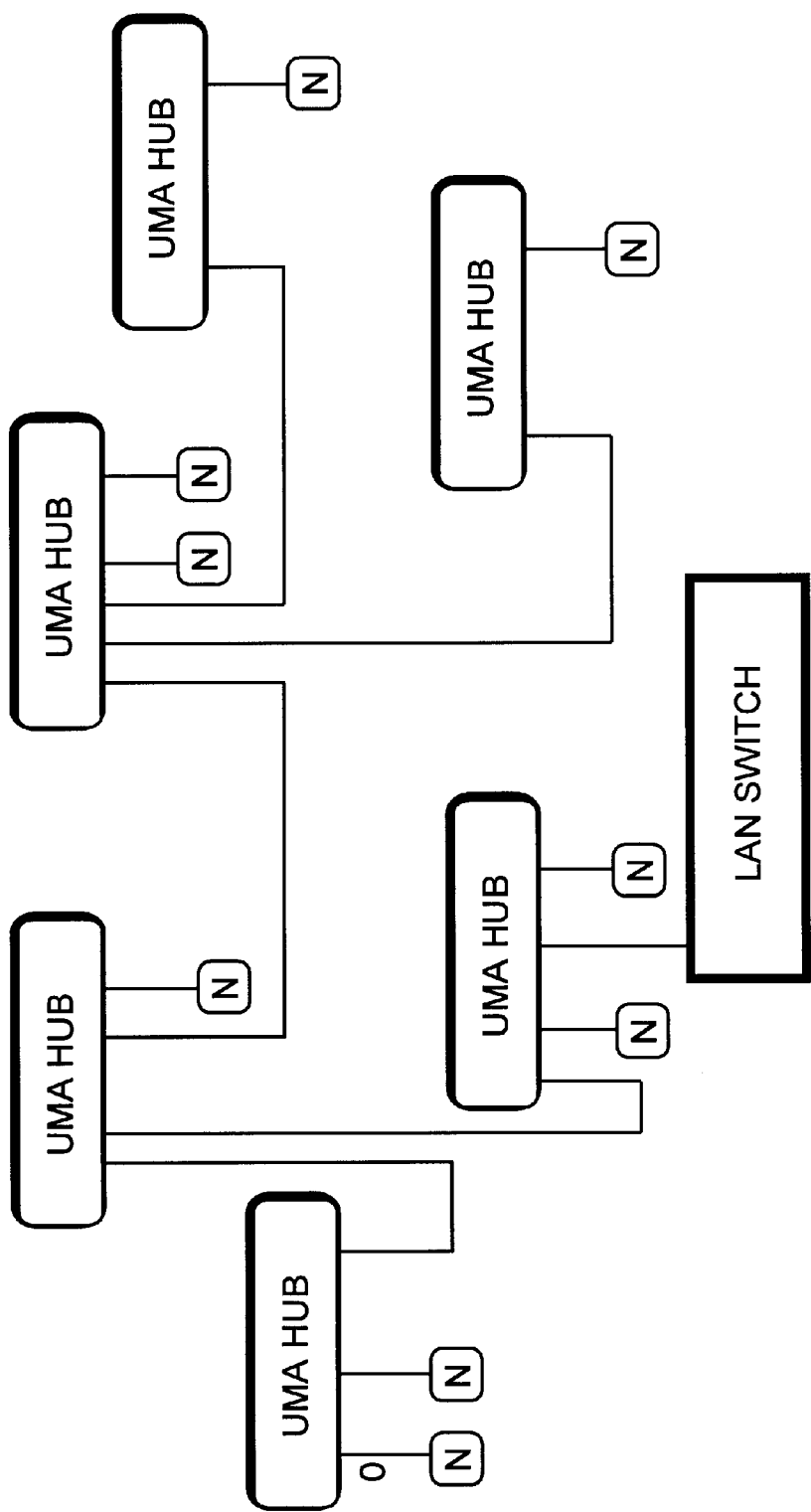

Multi-hub topology with a switch is illustrated by FIG. 26, which shows direct Interconnection of UMA hubs.

2.2.1. HUB States

Each node, when IM=DIR, can have two states:

1. Active State (AST) when the hub performs UMA algorithm and generates Access Windows (AW) to allow its user to transmit packets. Input channels of all active ports, but the port with AW, are closed.
2. Passive State (PST) when the hub just repeat signals receiving through an input port to all other ports.

An active hub moves from AST to PST when it opens window on a port z and receives the port the CRS Signal.

A passive port moves from PST to AST when it sees IFG on input of the port z, which had AW, when this hub moves to PST.

After PON or SS signals the hub closes all input ports, and monitors defined for direct connection input port, for example, input 0. If input line of port 0 is idle during TS, the hub moves to AST, otherwise to PST.

2.3 UMA Hub Algorithms

UMA can provide two types of collision-free, fair algorithms of multiple access:

1. Uniform UMA Algorithm (UMA) which is optimized for uniform (random) distribution of load between network nodes.
2. Adaptive UMA Algorithm (UMA-A) which adapts access to bursty traffic. When some proportion of nodes during some period of time have traffic for transmission (Active Nodes), while the others have at this time no packets for transmission, then the algorithm will adapt to share media capacity between the active nodes with monitoring of the passive nodes. When an active node becomes passive, or a passive node requires transmission, the algorithm will readjust the access procedure.

Uniform UMA is a specific case of adaptive UMA, when all the nodes are permanently active, independently if they transmit packets. This is simpler variant of UMA in comparison with adaptive UMA. As the adaptive UMA is more general and includes uniform UMA we will consider here only algorithm for adaptive UMA.

2.3.1 Algorithms of Adaptive UMA

Operation of adaptive UMA hub can be subdivided into access cycles (AC). In each AC all active nodes receive access window (AW) and can transmit packets. If an active node has no more packets for transmission it if transferred to passive nodes. At the same time the algorithm permanently monitors passive nodes, and if a passive node receives a packet from its upper layers, it will be transferred to active nodes.

Several different criteria can be used to transfer active nodes to passive state, and passive nodes—to active state. For example, if an active node receives AW and there is no CRS during period of AW, the node is transferred to passive state.

To transfer a port from passive state to active, the following examples of procedures can be used: (1) Each cycle one or several passive nodes (changing from cycle to cycle) receive AW, and if the node transmit a packet it becomes active node, (2) All passive nodes are permanently open and can start transmission at any time. If the hub receives CRS from a passive node, it closes the port (generating a collision) and discards the input signal. At the same time, the passive port is transferred to active state and will receive AWs, starting from the current or the next cycle.

2.3.1.1. Adaptive UMA with Open Passive Ports

In this section some more detailed description is given to illustrate the case, when all passive ports are open.

After the synch-signal all ports of the hub are active (NA=N) and have current access numbers (CANs) equal to their initial access numbers (IANs), which may correspond to the physical port numbers 0, 1, . . . NA. All ports are closed.

1. All NA active ports are opening one by one in sequence with their CANs. If an open port receives a packet, the packet is retransmitted to all other ports.

The port continues to be active, the next port is opened. If a port during its access window does not receive a packet it becomes passive. All active ports, which have CANs higher than the given port, decrease their CANs by 1. Next active port, having the same (after decrease) CAN is opened. All passive ports are open and have no CANs assigned.

2. After the last active port has been opened an active port, having CAN, equal to zero is opened, and new cycle is started.

3. If during a cycle a passive port receives CRS, it goes to closed state (generating a collision in the adapter card), the signal received are discarded, the port becomes active and is assigned CAN:=NA. The number of active ports is increased by 1.

2.3.1.2. Adaptive UMA with Closed Passive Ports

After the synch-signal all ports of the hub are active and have current access numbers (CANs) equal to their initial access numbers (IANs), which may correspond to the physical port numbers 0, 1, . . . N–1. All ports are closed.

1. All active ports are opened one by one in sequence with their CANs. If an open port receives a packet, the packet is retransmitted to all other ports. The port continues to be active, the next port is opened. If a port during its access window does not receives a packet it becomes passive and is assigned the highest CAN. All active and passive ports (if any), which have CANs higher than the given port, decrease their CANs by 1. Next active port having the same (after decrease) CAN is opened.

2. After the last active port has been opened and there is at least one passive port in the hub, a passive port, having the lowest CAN, is opened. If this port does not receive a packet, it remains to be passive and received the highest CAN number. All other passive ports decrease their CANs by one. An active port, having CAN, equal to zero is opened, and new cycle is started. If the opened passive port receives a packet, the port becomes active, and the next passive port (if any) is opened.

2.3.1.3. Media-Length Adaptation

To adapt to a distance between a hub port and the node, connected to the port, the following procedure of adaptation can be used:

Each active port in time of initialization opens AW, having a maximum duration, and monitors the time delay before CRS appears. This delay is stored and is used as time slot for this port. The time slot can be updated after a collision, after each moving to active state, after some predefined time etc.

Figure 27:
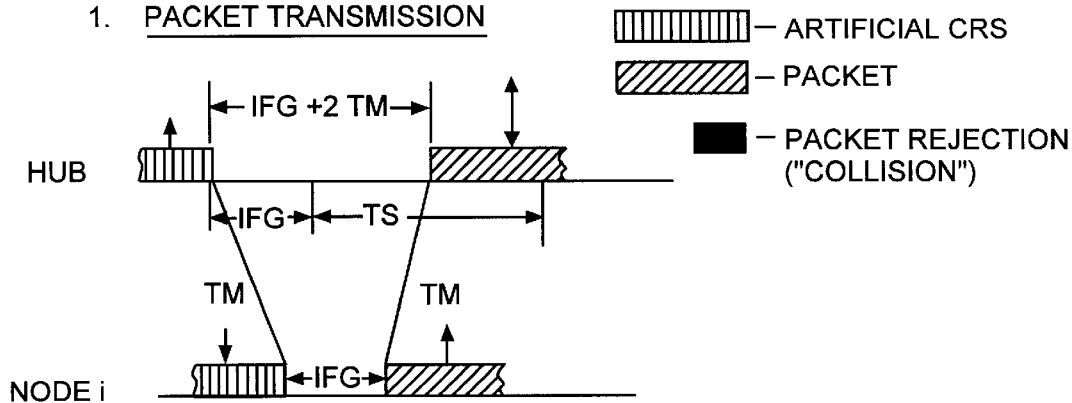
FIG. 27 illustrates a preferred operation of the access window.
Figure 27:
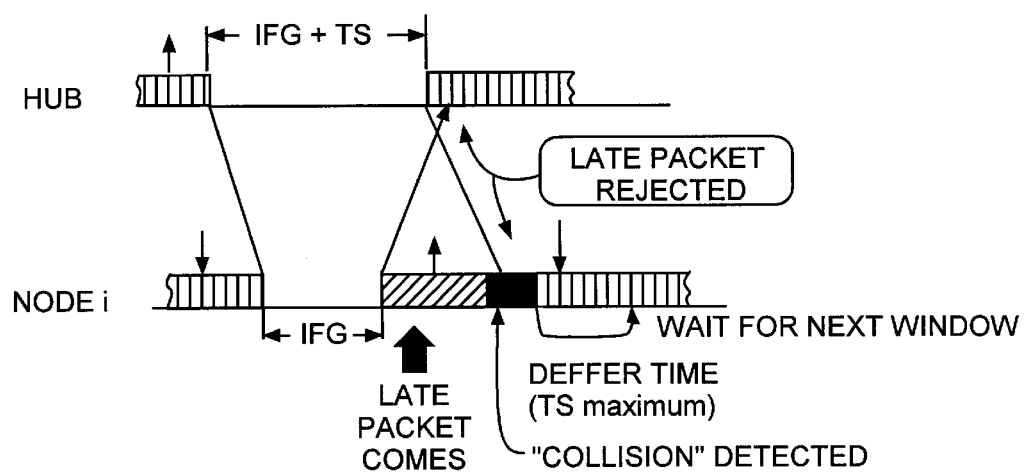
Figure 27:
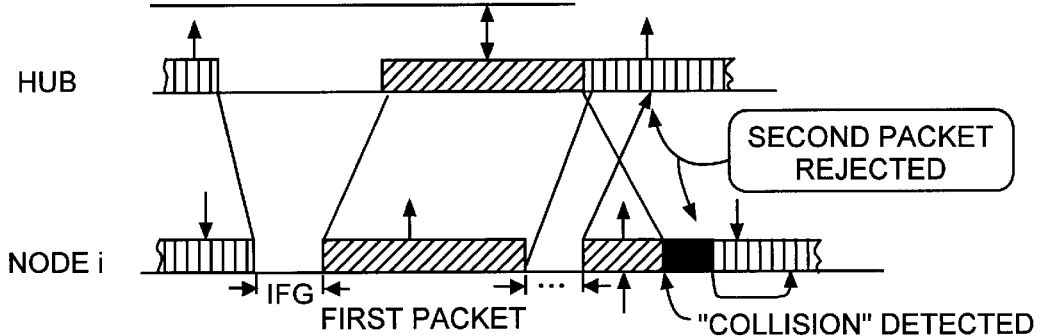
Figure 28:
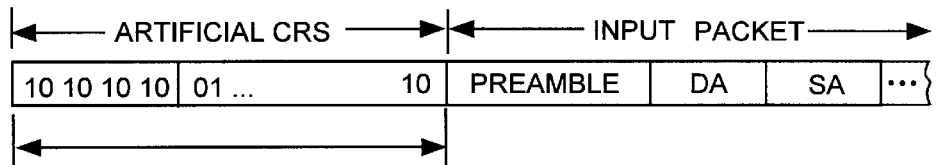
FIG. 28 illustrates a preferred artificial CRS options.
Figure 28:
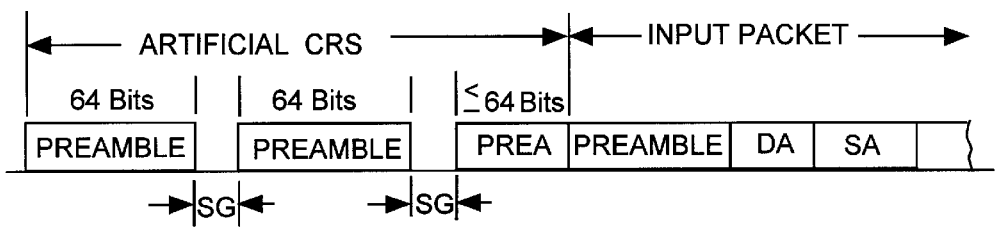
Figure 28:
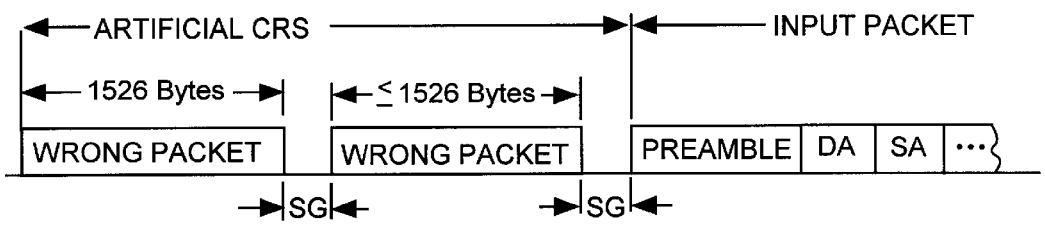

FIGS. 27–28 are figures showing aspects of the access window operation for a UMA real-time hub and artificial CRS options, respectively.

Although a preferred embodiment of the present invention and modifications thereof have been described in detail herein, it is to be understood that this invention is not limited to those precise embodiments and modifications, and that other modifications and variations may be affected by one of ordinary skill in the art without departing from the spirit and scope of the invention as defined in the appended claims.

What is claimed is:

1. A hub apparatus for adaptive multiple access in a communication network having a plurality of nodes, each node including at least one port, comprising:
    (a) a repeater;
    (b) a corrector, said corrector comprising:
        (i) a general server;
        (ii) a plurality of port controllers, each said port controller having an access window controller for selecting the state of the access window to a port of the network; and
        (iii) a logic circuit to assign each node an active or a passive state and to subdivide each transmission into cycles containing at least NA sub-cycles, where NA is the number of active nodes of the network; and
    (c) an interface having a first set of links coupling said corrector to said interface, a second set of links coupling said repeater to said interface, and a third set of links coupling said interface to transceivers of the network;
    wherein said hub is configured to select in each sub-cycle one of said active nodes to be accessed.

2. The apparatus of claim 1, wherein an active node contains data selected from the group consisting of data packets and control messages.

3. The apparatus of claim 2, wherein said corrector is configured to open in successive sub-cycles of each cycle access windows for an access period of time for each active node by sending an access window start signal.

4. The apparatus of claim 2, wherein each said port controller includes a current access number controller configured to calculate the current access number of a port when ports change their state.

5. The apparatus of claim 4, wherein each said port controller includes an access window controller for controlling the access window of the port controlled by said port controller.

6. The apparatus of claim 5, wherein said access window controller is configured to permit adaptation to variable network topology, variable node activity, bursty traffic, and variable channel length.

7. A method of adaptive multiple access in a communication tree network, comprising the steps of:
    (a) providing a plurality of network nodes, each node of said plurality of nodes comprising at least one port, said nodes selected from the group consisting of stations and repeaters, each station comprised of one port being connected to said repeater, each repeater having at least two ports, and wherein said medium comprises a full-duplex channel between each pair of connected ports;
    (b) providing at least one medium for the transmission of sessions between said ports, each said session comprising a sequence of at least one fragment, said fragments selected from the group consisting of data packets and control messages;
    (c) assigning an active state to each of said nodes that has at least one session for transmission;
    (d) assigning a passive state for each of said nodes that has no sessions for transmission;
    (e) subdividing the transmission into cycles, each said cycle comprising of at least NA sub-cycles, where NA is a number of active nodes;

(f) selecting for each sub-cycle one active node to be accessed so that each active node is accessed in each cycle;

(g) permitting transmission of said sessions from the selected nodes. assigning a zero port in each repeater;

(h) creating a tree network of repeaters by connecting the zero ports of the repeaters to non-zero ports of other repeaters;

(i) connecting each said station to the vacant port of the repeaters;

(j) transmitting an initiating control message from all ports of the repeaters;

(k) assigning the repeater a master state if the repeater does not receive the initiative control message from the zero port;

(l) assigning the repeater a slave state if the repeater receives the initiating control message from the zero port;

(m) sequentially opening the ports of the master repeater for an access period of time;

(n) changing the master state of the repeater to the slave state if the repeater receives the session from the open port;

(o) retransmitting the receiving session to other ports of the repeater;

(p) changing the slave state of the repeater to the master state after the end of the receiving session;

(q) permitting transmission of said session from the state connected to the open repeater port; and (r) transmitting a busy control signal from all non-open ports of said master repeater while the input of the open port is idle.

8. The method of claim 7 wherein during the access period the output of the open repeater port is idle.

9. The method of claim 7 wherein the duration of said access period is equal to at least the maximum roundtrip propagation delay of the network.

10. The method of claim 7 wherein the duration of said access period is equal to at least a roundtrip propagation delay of the channel between the repeater port and the node connected to the port, said roundtrip propagation delay of the channel determined by measuring a time interval between sending a control message from the repeater port to the connected node and receiving a response from the node.

11. The method of claim 7 wherein said busy control signal comprises a preamble of said data packet.

12. The method of claim 7 wherein said network comprises a head-end network, the plurality of nodes comprises a plurality of stations, and the media comprises an upward channel for transmitting from said stations to said head-end, and a downward channel for transmitting from the head-end to the stations with the head-end and the stations being connected both to the upward and downward channels.

13. The method of claim 12 further comprising the steps of:

at the head-end maintaining variables which store current information comprising the current states of said nodes;

opening in successive sub-cycles of each cycle access windows for an access period of time for each active station and, if NA<N, for at least one passive station, providing each passive station being open at least once per at most N−NA cycles, where N is the number of nodes in the network;

signaling the station having the open access window about the start of the access period by sending from said head-end to the station an access window start signal;

permitting the station during a predetermined start time after receiving the access window start signal to start transmitting the data packet;

changing the active state of the open active station to the passive state and decreasing NA by one, if the station does not start transmission of said session during the start time; and changing the passive state of the open passive station to the active state, if the passive station starts transmission of said session during the start time.

14. The method of claim 13 wherein the duration of said access period is equal to at least the sum of a maximum roundtrip propagation delay of the network and the duration of said start time.

15. The method of claim 7 wherein the plurality of nodes comprises a plurality of said stations, and wherein the media comprises at least one bi-directional bus, each said station being connected to each bus.

16. The method of claim 15, further comprising the steps of:

assigning each node a unique initial access number, IAN, said IAN selected from the sequence of 0, 1, 2, . . . N−1, where N is equal to the number of nodes in the network;

transmitting an initiating signal on the bus;

assigning each node said active state if the node has at least one packet for transmission while the initiating signal is being transmitted and assigning the node said passive state otherwise;

assigning each active node after transmitting the initiating signal a current access number, CAN equal to IAN;

maintaining at each node a variable associated with the number of active nodes, NA;

assigning NA equal to N after transmitting the initiating signal;

permitting transmission of said session from the active node, having CAN equal to zero;

decreasing the CAN of each active station after transmitting said session by another node;

assigning the CAN equal to NA−1 at the station transmitted a session;

decreasing the CAN and NA by one at each active station after each idle interval of a predetermined duration; and outputting the initiating signal from the passive node after appearance at least one session for transmission to the network.

17. The method of claim 16 wherein the duration of said idle interval is equal to at least the maximum roundtrip propagation delay of the network.

18. The method of claim 15 wherein said bi-directional bus comprises a plurality of bi-directional links, said links selected from the group consisting of wires, coaxial cables, intrachip connectors, wireless channels, optical channels, frequency division channels, time division channels, and infrared channels.

19. An apparatus for adaptive multiple access in a communication tree network, comprising:

(a) a plurality of nodes, each node comprising at least one port, said nodes selected from the group consisting of stations and repeaters, each station comprises one port being connected to said repeater, each repeater comprises of at least two ports, and wherein said medium comprises a full-duplex channel between each pair of connected ports;

(b) at least one medium for transmission of sessions between said ports, said session comprising a sequence of at least one fragment, said fragments selected from the group consisting of data packets and control messages;

(c) means for assigning each node an active state, if the node has at least one session for transmission;

(d) means for assigning each node a passive state, if the node has no sessions for transmission;

(e) means for subdividing the transmission into cycles, said cycle comprising of at least NA sub-cycles, where NA is a number of active nodes;

(f) means for selecting for each sub-cycle one accessing node to permit each active node to become the accessed node in each cycle; and (g) means for permitting transmission of said session from the selected accessed nodes;

(h) means for assigning a zero port in each repeater;

(i) means for creating a tree network of repeaters by connecting the zero ports of the repeaters to not-zero ports of other repeaters;

(j) means for connecting each said station to the vacant port of the repeaters;

(k) means for transmitting an initiating control message from all ports of the repeaters;

(l) means for assigning the repeater a master state if the repeater does not receive the initiating control message from the zero port;

(m) means for assigning the repeater a slave state if the repeater receives the initiating control message from the zero port;

(n) means for sequentially opening the ports of the master repeater for an access period of time;

(o) means for changing the master state of the repeater to the slave state if the repeater receives the session from the open port;

(p) means for retransmitting the receiving session to other ports of the repeater;

(q) means for changing the slave state of the repeater to the master state after the end of the receiving session;

(r) means for permitting transmission of said session from the station connected to the open repeater port; and (s) means for transmitting a busy control signal from all not-open ports of said master repeater while the input of the open port is idle.

20. The apparatus of claim 19, wherein said network comprises a head-end and said plurality of nodes of said head-end network comprises a plurality of stations, and wherein the media comprises an upward channel for transmitting from said stations to said head-end, and a downward channel for transmitting from the head-end to the stations, the head-end and the stations being connected both to the upward and downward channels.

21. The apparatus of claim 19, further comprising:

means for maintaining at the head-end variables which store current information comprising current states of said nodes;

means for opening in successive sub-cycles of each cycle access windows for an access period of time for each active station and, if NA<N, for at least one passive station, providing each passive station being open at least once per at most N−NA cycles, where N is the number of nodes in the network;

means for signaling the station having the open access window about the start of the access period by sending from said head-end to the station an access window start signal;

means for permitting the station during a predetermined start time after receiving the access window start signal start transmitting of the data packet;

means for changing the active state of the open active station to the passive state and decreasing NA by one, if the station does not start transmission of said session during the start time; and means for changing the passive state of the open passive station to the active state, if the passive station starts transmission of said session during the start time.

22. The apparatus of claim 19 wherein the plurality of nodes comprises a plurality of said stations, and wherein the media comprising of at least one bi-directional bus, each said station being connected to each bus.

23. The apparatus of claim 19, further comprising:

means for assigning each node a unique initial access number, IAN, said IAN taking from the sequence of 0, 1, 2, ... N−1. where N is equal to the number of nodes in the network;

means for transmitting an initiating signal on the bus;

means for assigning each node said active state, if the node has at least one packet for transmission while the initiating signal being transmitted, assigning the node said passive state otherwise;

means for assigning each active node after transmitting the initiating signal a current access number, CAN, equal to IAN;

means for maintaining at each node a variable associated with the number of active nodes, NA;

means for assigning NA equal to N after transmitting the initiating signal;

means for permitting transmission of said session from the active node, having CAN equal to zero;

means for decreasing the CAN of each active station after transmitting said session by another node;

means for assigning the CAN equal to NA−1 at the station transmitted a session;

means for decreasing the CAN and NA by one at each active station after each idle interval of a predetermined duration; and means for outputting the initiating signal from the passive node after its appearance.

* * * * *